US007626994B2

(12) United States Patent
Bennett

(10) Patent No.: US 7,626,994 B2
(45) Date of Patent: Dec. 1, 2009

(54) MULTIPLE NODE APPLICATIONS COOPERATIVELY MANAGING A PLURALITY OF PACKET SWITCHED NETWORK PATHWAYS

(75) Inventor: James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 485 days.

(21) Appl. No.: 11/365,102

(22) Filed: Mar. 1, 2006

(65) Prior Publication Data
US 2007/0110080 A1  May 17, 2007

Related U.S. Application Data

(60) Provisional application No. 60/736,889, filed on Nov. 14, 2005.

(51) Int. Cl.
*H04L 12/56* (2006.01)
*H04J 1/16* (2006.01)

(52) U.S. Cl. ............... 370/419; 370/216; 370/252

(58) Field of Classification Search ........ 370/419, 370/252, 216
See application file for complete search history.

(56) References Cited

U.S. PATENT DOCUMENTS

| 6,804,532 | B1* | 10/2004 | Moon et al. ............ 455/552.1 |
| 7,293,110 | B2* | 11/2007 | Dowling .................... 709/249 |
| 2002/0194385 | A1 | 12/2002 | Linder | |
| 2003/0058832 | A1 | 3/2003 | Knauerhase | |
| 2004/0097263 | A1 | 5/2004 | Katayama | |
| 2004/0170181 | A1 | 9/2004 | Bogdon et al. | |
| 2004/0221154 | A1* | 11/2004 | Aggarwal ................ 713/151 |
| 2005/0070326 | A1 | 3/2005 | Morton | |
| 2005/0185621 | A1 | 8/2005 | Sivakumar | |
| 2005/0185632 | A1 | 8/2005 | Draves, Jr. et al. | |
| 2006/0023676 | A1 | 2/2006 | Whitmore et al. | |

FOREIGN PATENT DOCUMENTS

| EP | 0963082 A | 12/1999 |
| EP | 1089495 A2 | 4/2001 |

(Continued)

OTHER PUBLICATIONS

Extended EP Search Report dated Mar. 31, 2008.

(Continued)

*Primary Examiner*—John Pezzlo
(74) *Attorney, Agent, or Firm*—Garlick Harrison & Markison

(57) ABSTRACT

End-point devices, access points and other types of network nodes each employ multi-path management software to manage communication via multiple possible paths to the Internet backbone from communication applications that run on an end-point device. Although the multi-path management software on an end-point device may operate independently, it may also cooperate with the local communication applications and the multi-path management software located on the access points or other network nodes to select one or more pathways for the local communication applications. Alternatively, the multi-path management software of an end-point device may pass all or a portion of such management responsibility to a local communication application and/or to multi-path management software of another network node. In addition to managing the selection of one or more pathways, the multi-path management software seamlessly switches pathways as may become necessary to meet changing network conditions or bandwidth demands.

9 Claims, 11 Drawing Sheets

FOREIGN PATENT DOCUMENTS

| | | |
|---|---|---|
| EP | 1337076 A1 | 8/2003 |
| EP | 1517575 A | 3/2005 |
| EP | 1589781 A | 10/2005 |
| EP | 1650904 A1 | 4/2006 |
| WO | 0163946 A | 8/2001 |
| WO | WO 03/065654 A | 8/2003 |
| WO | WO 03094017 A1 * | 11/2003 |
| WO | 2004023740 A | 3/2004 |
| WO | WO 2004097594 A | 11/2004 |
| WO | WO 2005/008968 A | 1/2005 |

OTHER PUBLICATIONS

Bernhard Walke et al; "Architecture Proposal for the Winner Radio Access Network and Protocol"; Internet Citation, Jun. 2004.

Tourrilhes J. et al.: "P-handoff: A Protocol For Fine Grained Peer-to-Peer Vertical Handoff" Personal, Indoor and Mobile Radio Communication, 2002. The 13th IEEE International Symposium on Sep. 15-18, 2002 Piscataway. NJ.

Partial EP Search Report dated Mar. 31, 2008.

* cited by examiner

MULTIPLE NODE APPLICATIONS COOPERATIVELY MANAGING A PLURALITY OF PACKET SWITCHED NETWORK PATHWAYS

CROSS-REFERENCE TO RELATED APPLICATIONS/INCORPORATION BY REFERENCE

This application claims priority to U.S. Provisional Application Ser. No. 60/736,889, filed Nov. 14, 2005, the disclosure of which is incorporated herein by reference in its entirety for all purposes.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

1. Field of the Invention

Various aspects of present invention relate to simultaneously managing a plurality of associations with a plurality of variety of communication networks; and, more specifically, to managing a plurality of Internet pathways available to an end-point device that services one or more communication applications.

2. Description of the Related Art

A computer, video game box, phone, PDA (Personal Digital Assistant) and many other types of terminals may be connected to a communication data network. Each terminal is typically assigned a unique network address by the communication data network. The terminal receives and sends data to the communication data network using the unique network address. The communication data network may be, for example, an EDGE (Enhanced Data Rates for GSM Evolution) network, GSM (Global System for Mobile Communications) network, CDMA (Code Division Multiple Access) network, IEEE (Institute of Electrical and Electronics Engineers) 802.11 network, Bluetooth, WiMax network, Internet, Intranet, satellite network, etc. The data typically exchanged between the terminal and the communication data network comprises media, such as text, audio, video and images, and control signals exchanged with a destination device, e.g., a server or another terminal. Media may be captured and exchanged in real time or from longer term storage.

Some terminals may connect to more than one communication data network to communicate with a destination device. For example, a terminal may have a wireless interface card and a wired interface card to connect to a WiMax network and an Ethernet LAN (Local Area Network), respectively. For a particular software application running on the terminal or for all such applications running during a period of time, the terminal sends and receives data via a selected one of the WiMax or Ethernet networks. The communication data network with which the terminal will exchange data is determined a priori. Before beginning of data exchange, the user of the terminal via a software application running on the terminal configures and selects one of a plurality of available communication data networks, e.g., the WiMax network or the Ethernet LAN, to be used for subsequent data exchange. Once decided, the terminal uses the selected communication data network and corresponding interface card to receive and transmit data.

For a variety of well know reasons, a selected communication data network often begins to exhibit unacceptable performance or goes out of service during data exchange. For example, the terminal typically connects to an access point of the selected communication data network via a wired or wireless link. Loss of service is usually related to the pathway from the terminal through such access point caused by: 1) the terminal moving out of wireless range; 2) disconnected cabling; 3) interference from other terminals; and 4) technical glitches in the access point or terminal hardware and software. Upon experiencing unacceptable performance or service failure during a data exchange, software applications running on the terminal often fail or require termination so that another communication data network can be selected by the user. Such selection often requires configuration of the newly selected communication data network as well. Occurrence of failure of one communication data network and subsequent configuration and switching to another causes significant delay and sometimes loss of data.

Further limitations and disadvantages of conventional and traditional approaches will become apparent to one of ordinary skill in the art through comparison of such systems with various aspects of the present invention.

BRIEF SUMMARY OF THE INVENTION

A device that interacts with a variety of communication data networks and controls exchange of data packets selectively with the variety of communication data networks, substantially as shown in and/or described in connection with at least one of the figures, as set forth more completely in the claims. These and other advantages, aspects and novel features of the present invention, as well as details of illustrative aspects thereof, will be more fully understood from the following description and drawings.

BRIEF DESCRIPTION OF THE DRAWINGS

For various aspects of the present invention to be easily understood and readily practiced, various aspects will now be described, for purposes of illustration and not limitation, in conjunction with the following figures.

DETAILED DESCRIPTION

Figure 1:
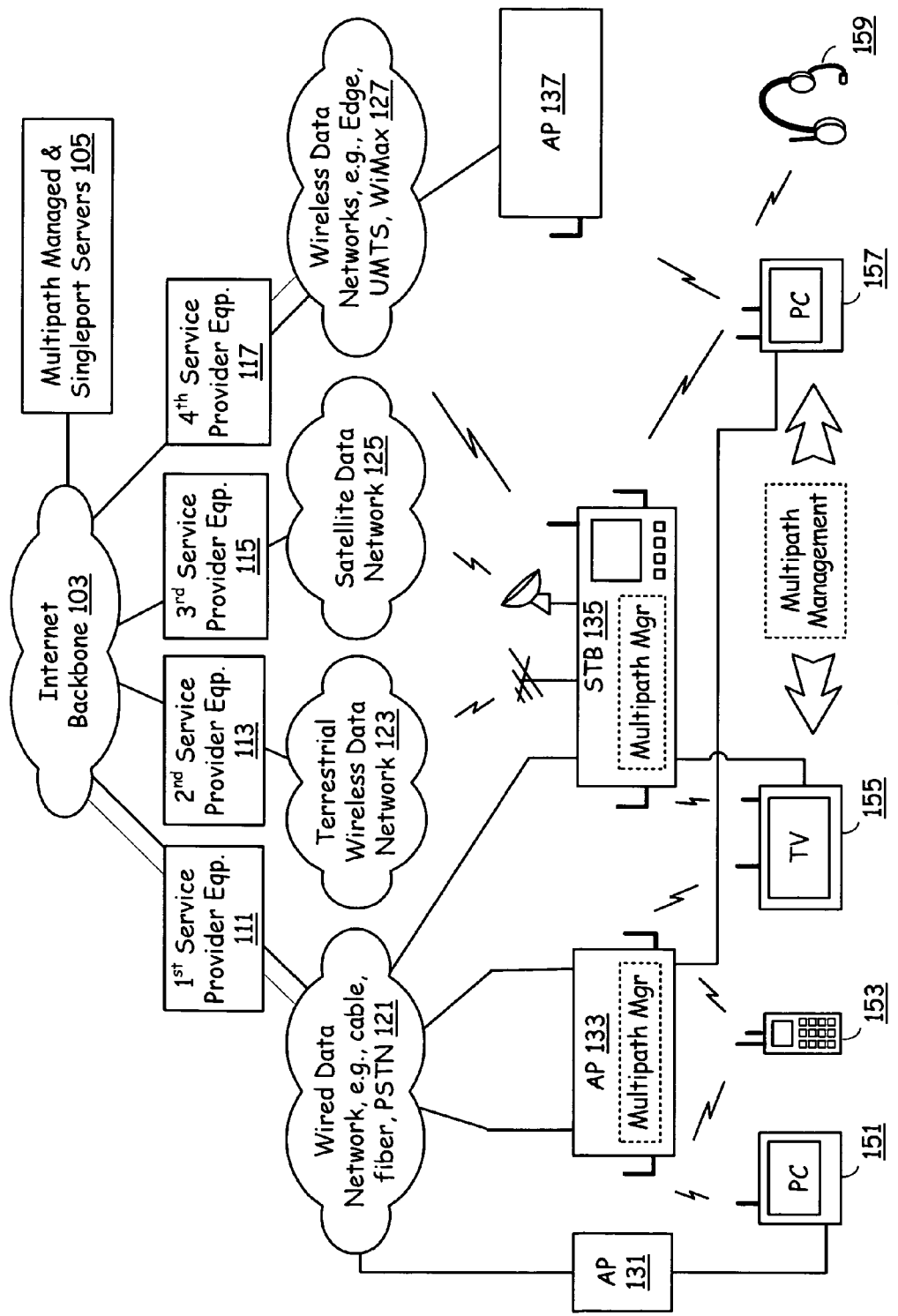
FIG. 1 is a schematic block diagram illustrating interaction between a plurality of devices and an Internet backbone via a plurality of access points, each of the plurality of devices interacting with more than one access point in accordance with various aspects of the present invention.

FIG. 1 is a schematic block diagram illustrating interaction between a plurality of devices, 151, 153, 155, 157 and 159 and an Internet backbone 103 via a plurality of access points 131, 133, 135 and 137, each of the plurality of devices 151, 153, 155, 157 and 159 interacting with more than one access point. A first personal computer 151, a phone 153, a television 155, a second personal computer 157 and a headset 159 interact with the Internet backbone 103. First service provider equipment 111, second service provider equipment 113, third service provider equipment 115, and fourth service provider equipment 117 are communicatively connected to the Internet backbone 103. Each of the plurality of service provider equipments 111, 113, 115 and 117 may be one or combination of a computing device, router, switch, base station, antenna, transceivers domain name server, proxy server, storage server, for example. Each of the plurality of service provider equipments 111, 113, 115 and 117 are communicatively coupled to the Internet backbone 103 via wired (including fiber) and/or wireless links.

The first service provider equipment 111 manages a wired data network 121. The wired data network 121 may be one or combination of a PSTN network, a fiber network and a cable network. A first access point 131, a second access point 133 and a third access point, i.e., a set top box 135, are communicatively connected to the wired data network 121. The second service provider equipment 113 manages a terrestrial wireless data network 123. The terrestrial wireless data network 123 may be a television broadcast network involving UHF (Ultra-High Frequency) or VHF (Very High Frequency) transmissions, for example. The set top box 135 is communicatively connected to the terrestrial wireless data network 123. The third service provider equipment 115 manages a satellite data network 125. The set top box 135 communicates with the satellite data network 125 using a dish antenna. The fourth service provider equipment 117 manages a wireless data network 127. The wireless data network 127 may be an EDGE network, WCDMA (Wideband Code Division Multiple Access) network, IEEE 802.11 network, WiMax network, or UMTS (Universal Mobile Telecommunications System) network, for example. The set top box 135 is also adapted to communicate with the wireless data network 127.

A fourth access point 137 is communicatively connected to the wireless data network 127. Each of the access points 131, 133, 135 and 137 comprises at least one (typically two or more) transceiver that receives and transmits data. The first access point 131 receives data from the first personal computer 151 and sends the received data to the wired data network 121. The first access point 131 also receives data from the wired data network 121 and sends the data to the first personal computer 151. The data may comprise control information, supporting data, and varieties of multimedia such as text message, audio, video, picture, email, television content, music video, or file, and is exchanged with another network device, such as an Internet server, broadcasting equipment or another terminal.

The first personal computer 151 is connected to the first access point 131 via a wired interface and connected to the second access point 133 via a wireless interface. The first personal computer 151 is thus capable of receiving and sending data to the wired data network 121 either via the first access point 131 or via the second access point 133. The first access point 131 assigns a first IP address to the first personal computer 151 and the second access point assigns a second IP address to the first personal computer 151. The phone 153 is communicatively connected with the second AP via two wireless links. The television 155 is communicatively connected to the second AP 133 via a wireless link. The second personal computer 157 is communicatively connected to the second AP 133 via a wired link. The second AP 133 is connected to the wired data network 121 via two wired links, a first wired link and a second wired link.

As illustrated, each terminal has many possible available communication pathways to any other terminal, server or other network device. The first personal computer 151 has two upstream pathways via the AP 131 and 133. The telephone 133 has two upstream pathways, both via the AP 133, and the television 155 and the personal computer 157 each have three. To manage communication among the available plurality of upstream pathways, each of the terminals 151-157 employ multi-path management functionality through a combination of general and/or specific purpose hardware and associated software. Similarly, the access point 133 and the set top box 135 both have two or more upstream communication pathways through which other terminals, servers and other network devices can be reached, and two or more downstream communication pathways. To manage communication among the available plurality of upstream and downstream pathways, the access point 133 and the set top box 135 also employ multi-path management functionality through a combination of general and/or specific purpose hardware and associated software. Likewise, any other network device having two or more upstream or two or more downstream pathways, such as some of the servers 105, may utilize the multi-path management functionality.

As used herein, "upstream pathway" and "downstream pathway" do not refer to actual direction of data flow. Instead, "upstream pathway" refers to a pathway from the present device that communicatively couples with the Internet backbone 103, while "downstream pathway" refers to a pathway from the present device toward an end-point device. Thus, for example, the access point 133 has two upstream pathways (both relevant to the personal computer 151) and three downstream pathways (only one relevant to the personal computer 151).

Specifically, each network device having multiple upstream and/or multiple downstream pathways executes a multi-path management software application. Thus, in available pathways between two end-point devices, there may be one or a plurality of multi-path management applications running. Where there is only one, the multi-path management application operates to select from among the available upstream and downstream pathways to support the exchange between the two end-point devices. This selection may involve one or more upstream pathways and/or one or more downstream pathways. Others of the upstream and downstream pathways may be maintained in an inactive state, or used to support other end-point device exchanges. Also, some pathways may be support pluralities of end-point device exchanges taking place at the same time.

When a plurality of multi-path applications exist in an overall pathway between two end-point devices, each will operate pursuant to local settings. For example, depending on the network configuration and local settings and with or without support from any upstream multi-path application, each multi-path management application may independently manage its upstream pathways but not downstream. Alternatively, based on settings, all or a portion of the overall management process can be centralized to one multi-path application with the others entering a dormant state or taking on a supporting role. Likewise, all or some of the multi-path management applications may operate in concert to manage a data exchange between any two end-point devices.

Pathway selection may be performed, for example: 1) upon powering up an end-point device; 2) as pathway characteristics change; 3) as pathways change or become available; 4) as demands change; and 5) periodically or continuously. Selection may be for all communication involving, for example: a) the end-point device; b) a particular communication software application; c) a particular media type; and/or d) on a request by request basis.

As an example, the first personal computer 151 (or a user using the first personal computer 151) desires to send (upstream) data to a destination terminal connected to the Internet backbone 103. The first personal computer 151 is associated with the first access point 131 through the first IP address and is associated with the second access point 133 through the second IP address. The multi-path management application running on the first personal computer 151 evaluates and chooses one or both of the two available upstream pathways to conduct one or ongoing communication exchanges. Alternatively, if so configured, the multi-path management application running on the first personal computer 151 might merely evaluate (or assist in evaluating) the two available upstream pathways and send related information and results to the first service provider equipment 111. Multi-path management functionality performed by the first service provider equipment 111 responds by evaluating the received information and results and, based thereon, instructs the first personal computer 151 to use the second IP address and the wireless interface to communicate with the wired data network 121.

For the phone 153, multi-path management software running on the phone 153, the access point 133 and the first service provider equipment 111 could be similarly act independently or in concert in the selection process. For example, the second access point 133 exchanges data with the phone 153 via a link selected by the multi-path management software running on the phone 153, and the second access point 133 exchanges data with the first service provider equipment 111 pursuant to instructions from the multi-path management software running on the first service provider equipment 111. Many other variations are contemplated, such as differing pathways based on data flow, e.g., pathways from a first end-point device to a second might involve different multi-path management responsibilities and resulting pathway selection than that from the second end-point device to the first. The pathway from the first end-point device to the second might involve each device making its own, independent assessment and selection of one or more of its links that lead to the second end-point device. Likewise, in the pathway from the second end-point device to the first, each device may only make its own, independent assessment and selection of one or more of its links that lead to the first end-point device.

When responsible to do so, a multi-path management application evaluates a plurality of characteristics for each available upstream and downstream link. Based on such characteristics, the multi-path management application generates a link rating for each link that comprises one or more factors. By comparing the one or more factors of the first and second link ratings, the multi-path management application can determine which of the available links in a pathway to use.

The plurality of characteristics may include maximum and current bandwidth, loading, queue backlogs, competing demands, data types, interference, error rates, security, link billing costs, etc. In particular, some of the first and second plurality of characteristics are time invariant and others vary with time. For example, those that vary over time may do so because of changes in bandwidth, pathway routing, network load, QoS (Quality of Service), transmission power requirements, error rate, roaming, etc. Some characteristics that may not vary over time include, for example, link billing costs, maximum bandwidth, QoS guarantees, robustness of the second wired link against eavesdropping, circuit vs. packet switched characteristics, etc.

After an initial evaluation and selection of a link between the AP 133 and the phone 153, the multi-path management application program running on the AP 133 may reevaluate its decision at regular intervals, new demands are placed on the link, and whenever another change occurs that exceeds some preset threshold. If a more appropriate configuration is warranted, the multi-path management application will direct link changes in accommodation. This may happen, for example, due to an increase in amount of data required by the television 155 that opens a second window to display a second video stream, or due to another data exchange ending and freeing up a more desirable link path. Alternatively, a large amount of data may be waiting at the first personal computer 151 for upstream delivery at a subsequent instant of time. Using a currently active link for such delivery may place immediate loading on the link that exceeds an acceptable bandwidth for another use of the same link. In response, the multi-path management application program might direct a rerouting of such other use or of all or a portion of the delivery burden of the large amount of data.

The multi-path management application program seamlessly switches data transportation from one link to another with or without end-point device and/or end-point communication application software being notified. For example, the first personal computer 151 may be unaware of the wired link via which the second AP 133 carries data generated by the first PC 151 to the wired data network 121. The television 155 and the second PC 157 may also be kept unaware of the switching performed by the multi-path management application program. The switching of data transportation along the second wired link to that along the first wired link does not hamper flow of data, generated by the television 155 and/or data generated by the second PC 157, via the second AP 133.

The second PC 157 is associated with the second AP 133, the set top box 135 and the fourth AP 137. The second PC 157 comprises a wired interface, a first wireless interface and a second wireless interface. The second AP 133 assigns a third IP address to the second PC 157. The set top box 135 assigns a fourth IP address to the second PC 157. The fourth AP 137 assigns a fifth IP address to the second PC 157. The second PC 157 communicates with the wired data network 121 via the second AP 133 and using the third IP address and the wired interface. The second PC 157 communicates with the set top box 135 using the fourth IP address and the first wireless interface. The second PC 157 communicates with the fourth AP 137 using the fifth IP address and the second wireless interface. A second multi-path management program is running on the second PC 157. The second multi-path management program is a piece of software that manages three communication associations, first association with the second AP 133, second association with the set top box 135 and third association with the fourth AP 137. The second multi-path management program collects a plurality of characteristics or parameters related to the three communication associations periodically. The second multi-path management program may collect the plurality of parameters whenever a change occurs in any of the three communication associations. The plurality of parameters may include, IP address of each of the three associations, data traffic carried by each of the associations, bandwidth offered by each of the associations, encryption and encoding supported by each of the associations, power requirement on each of the associations, type of each of the associations, latency introduced by each of the associations, interference level in each of the associations which may be dependent on the data traffic carried by each of the associations, etc. The second multi-path management program stores the plurality of collected parameters in a memory of the second PC 157. In a second embodiment, the second multi-path management program updates the plurality of parameters with a new set of collected plurality of parameters and forgets old set of plurality of parameters. In the second embodiment the multi-path management program causes the old set of plurality of parameters to be stored in a storage system until the new set of plurality of parameters is collected.

The second PC 157 or a user using the second PC 157 desires to send data to a destination device connected to the Internet backbone 103. The second PC 157 generates a request for data transmission. In response to the request, the second multi-path management program retrieves the plurality of parameters related to the three communication associations. The second multi-path management program may collect at least some of the plurality of parameters, for example, the bandwidth offered by each of the associations, the encryption and encoding supported by each of the associations, the latency introduced by each of the associations, the interference level in each of the associations etc. from the second access point 133, the set top box 135 and the fourth access point 137. The plurality of parameters may be retrieved from the memory of the second PC 157. The plurality of parameters may be retrieved from a separate storage system that is not housed with the second PC 157. Some or all of the plurality of parameters, for example, the IP addresses corresponding to each of the associations may be retrieved from the wired interface, the first wireless interface and the second wireless interface of the second PC 157. The multi-path management program selects an interface from the three interfaces, the wired interface, the first wireless interface and the second wireless interface using the plurality of retrieved parameters and directs the second PC 157 to send (i.e., upstream) data to the Internet backbone 103 using the selected interface and corresponding IP address. The multi-path management program performs the selection to render best possible service to data upstreaming process. As an example, the multi-path management program selects the second wireless interface. The second PC 157 uses the fifth IP address assigned by the fourth access point 137 to send data to the fourth access point 137. The data is received by the fourth access point 137 and sent to the destination device using the wireless data network 127.

Wireless link between the fourth access point 137 and the second wireless interface of the second PC 157 may go down while the second PC 157 is sending to and/or receiving data from the fourth access point. If the wireless link goes down, then the software application program directs the second PC 157 to use one of the remaining two interfaces, i.e., the wired interface and the first wireless interface. The software application program selects the one interface that provides better service. The selection of the one interface from the remaining two interfaces depends on the plurality of retrieved parameters. As an example the software application program selects the wired interface. The second PC 157 uses the wired interface and the third IP address to send the data. The change of interface from the second wireless interface to the wired interface is performed seamlessly so that no data sent by the second PC 157 gets lost. The data sent by the second PC 157 reaches the second AP 133. The second AP 133 is connected to the wired data network 121 via two links. The multi-path management application program that is running on the second AP 133 selects one of the two links to the wired data network 121 for sending the data received from the second PC 157 to the wired data network 121. The second AP 133 sends the data received from the second PC 157 to the wired data network using the selected link. The data sent by the second PC 157 eventually reaches the destination node via the second AP 133, the wired data network 121 and the Internet backbone 103.

In yet another embodiment, the second multi-path management program running on the second PC 157 retrieves the plurality of parameters corresponding to all the three associations periodically. The multi-path management program may choose a threshold value and whenever quality of any one of the three associations goes below the threshold value, the multi-path management program quarantines the corresponding association. In this exemplary case, the second PC 157 uses the wireless link between the fourth access point 137 and the second wireless interface of the second PC 157 to send data. As quality of the wireless link goes below the threshold value, the multi-path application program may prompt the second PC 157 to switch to the wired interface and use the third IP address for sending data. Switching from the second wireless interface to the wired interface thus happens before the wireless link goes down. The multi-path application program guarantees that no data (i.e., data packet sent by the second PC 157) is lost due to the switching.

Figure 2:
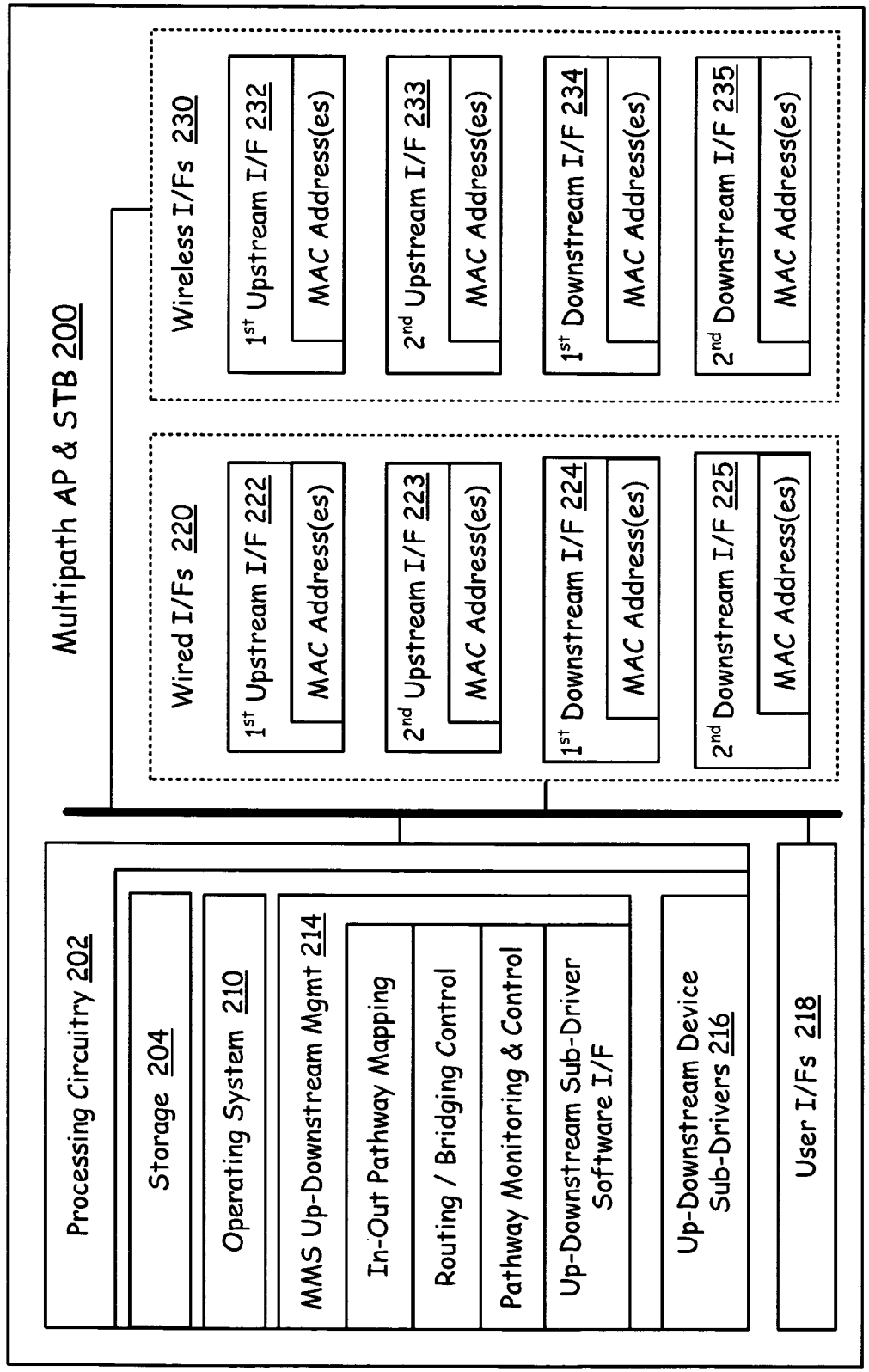
FIG. 2 is a schematic block diagram illustrating a plurality of components of an access point of FIG. 1, the access point supporting a plurality of data paths from the access point to the Internet backbone.

FIG. 2 is a schematic block diagram illustrating a plurality of components of an access point 133 of FIG. 1, the access point 133 supporting a plurality of data paths from the access point 133 to the Internet backbone 103. The set top box 135 of FIG. 1 also supports more than one data communication pathway from the set top box 135 to the Internet backbone 103. FIG. 2 illustrates the plurality of components that are common to the multi-path access point 133 and the multi-path set top box 135 of FIG. 1. The multi-path AP or the multi-path STB (set top box) 200 comprises a processing circuitry 202, a user input interface 218, a plurality of wired interfaces 220 and a plurality of wireless interfaces 230. The processing circuitry 202 comprises a storage system 204, an operating system 210, a multi-path management software (MMS) 214 and a device sub-driver 216. The user input interface 218 receives an input from a user and the processing circuitry 202 responds to the input accordingly. The user input interface 218 may be a plurality of buttons, a touch screen, a voice based interface, a mouse, a thumbwheel, a screen and a pen, etc. The plurality of wired interfaces 220 comprise a first wired upstream interface 222, a second wired upstream interface 223, a first wired downstream interface 224 and a second wired downstream interface 225. The plurality of wireless interfaces 230 comprise a first wireless upstream interface 232, a second wireless upstream interface 233, a first wireless downstream interface 234 and a second wireless downstream interface 235. The upstream interfaces (wired upstream and wireless upstream interfaces) of the multi-path AP (or the multi-path STB) 200 support data communication between the multi-path AP (or the multi-path STB) 200 to one or more data networks and the downstream interfaces (wired downstream and wireless downstream interfaces) support data communication between the multi-path AP (or the multi-path STB) 200 and one or more client devices. A client device is a terminal and/or equipment that generates data. Typical examples of the client device are a personal computer, a phone, a PDA, a video game box, a television or any of a variety of terminals that generates data in a first format (e.g., data fragmented into packets) that can be transported across a packet switched network. The data may be an audio, a video, a picture, an email, a web page, a music video, a file stored in an Internet and/or Intranet server, a text message, a television program and any of a variety of multimedia information. Typical examples of a data network are a fiber data network, a cable data network, a public switched telephone network, a GSM network, a CDMA network, an EDGE network, an IEEE 802.11 network, a WiMax network, a satellite data network or any of a variety of standard or proprietary packet switched network.

For example and without limitation the multi-path AP (or the multi-path STB) 200 communicates with a fiber data network using the first upstream wired interface 222, with a cable data network using the second upstream wired interface 223, with an EDGE network using the first upstream wireless interface 232 and with a WiMax network using the second upstream interface 233. The fiber data network, the cable data network, the EDGE network and the WiMax network use different protocols for packet data transmission and reception. Each of the wired and wireless upstream interfaces (222, 223, 232 and 233) interacts with at least a corresponding hardware device, and the corresponding hardware device is uniquely identified by a medium access control (MAC) address. The corresponding hardware device typically comprises a transceiver. The multi-path AP (or the multi-path STB) 200 associates itself with the fiber data network, the cable data network, the EDGE network and the WiMax network prior to communicating with these networks. Association includes assignment of an IP address by the corresponding data communication network to the multi-path AP (or the multi-path STB) 200. The multi-path AP (or the multi-path STB) 200 is assigned a first IP by the fiber data network, a second IP by the cable data network, a third IP by the EDGE network and a fourth IP by the WiMax network during the association. The multi-path AP (or the multi-path STB) 200 communicates with the fiber data network via the first upstream wired interface 222 using the first IP address Similarly the multi-path AP (or the multi-path STB) 200 communicates with the cable data network via the second upstream wired interface 223 using the second IP address, with the EDGE network via the first upstream wireless interface 232 using the third IP address and with the WiMax network via the second upstream interface 233 using the fourth IP address.

In this non limiting example, the multi-path AP (or the multi-path STB) 200 communicates with a personal computer using the a first wired downstream interface 224, with a headset using the second wired downstream interface 225, with a phone using the first wireless downstream interface 234 and with a television using the second wireless downstream interface 235. The multi-path AP (or the multi-path STB) 200 in this exemplary case is connected to a heterogeneous type of packet data networks (i.e., the fiber data network, the cable data network, the EDGE network and the WiMax network). The type of packet data networks to which the multi-path AP (or the multi-path STB) 200 is communicatively connected is kept hidden from the personal computer, the headset, the phone and the television (i.e., the client devices). The MMS 214 of the multi-path AP (or the multi-path STB) 200 assigns a fifth IP address, a sixth IP address, a seventh IP address and a eighth IP address respectively to the personal computer, the headset, the phone and the television when these client devices broadcast an association request. The MMS 214 of the multi-path AP (or the multi-path STB) 200 directs the personal computer to send data in a first format to the multi-path AP (or the multi-path STB) 200 using the fifth IP address. The multi-path AP (or the multi-path STB) 200 receives the data in the first format from the personal computer via the first wired downstream interface 224.

The multi-path AP (or the multi-path STB) 200 is communicatively connected to the Internet backbone via the first wired upstream interface 222, the second wired upstream interface 223, the first wireless upstream interface 232 and the second wireless upstream interface 233. The MMS 214 evaluates a first metric corresponding to the first wired upstream interface 222, a second metric corresponding to the second wired upstream interface 223, a third metric corresponding to the first wireless upstream interface 232 and a fourth metric corresponding to the second wireless upstream interface 233. The first metric at an instant of time may depend on a plurality of parameters. The plurality of parameters may be maximum bandwidth the first wired upstream interface 222 supports, data load that is waiting to be upstreamed from the client devices (the personal computer, the headset, the phone and the television) to the Internet backbone via the multi-path AP (or the multi-path STB) 200, amount of data traveling via the first wired upstream interface 222 at the instant of time, type of the data load waiting to be upstreamed via the multi-path AP (or the multi-path STB) 200 (i.e., if the data load to be upstreamed is a text message, a video file, a real time data, a non real time data etc.) and power requirement of the first wired upstream interface 222. The first metric is a time varying parameter. The MMS 214 evaluates the first metric at regular intervals. The second metric, the third metric and the fourth metric corresponding to respectively the second wired upstream interface 223, the first wireless upstream interface 232 and the second wireless upstream interface 233 are time varying parameters. The MMS 214 evaluates the second metric, the third metric and the fourth metric at regular intervals. The MMS 214 may evaluate the first metric, the second metric, the third metric and the fourth metric in response to a data upstream request from any one of client devices (the personal computer, the headset, the phone or the television). The MMS 214 may evaluate the first metric, the second metric, the third metric and the fourth metric in response to an user input received via the user input interface 218 of the multi-path AP (or the multi-path STB) 200. The MMS 214 stores the first metric, the second metric, the third metric and the fourth metric in the storage system 204 of the multi-path AP (or the multi-path STB) 200. The MMS 214 updates the stored value of the first metric, the second metric, the third metric and the fourth metric whenever the MMS 214 evaluates a new set of metric values.

The MMS 214 may collect the plurality of parameters on which the metric values (the first metric, the second metric, the third metric and the fourth metric) depend, from the plurality of wired interfaces 220, the plurality of wireless interfaces 230, the operating system 210, the storage system 204 and the client devices (the computer, the headset, the phone, the television). In this exemplary case, the device sub-driver 216 of the multi-path AP (or the multi-path STB) 200 senses presence of data, which has come from the personal computer, at the first wired downstream interface 224. The device sub driver 216 informs the MMS 214 about the presence of the data. Subsequently the MMS 214 of the multi-path AP (or the multi-path STB) 200 evaluates the four metric values. The evaluation of the four metric values is performed by the MMS such that better a data communication link, higher is the corresponding metric value. In this non-limiting example, the second metric may have the highest value among the four metric values. The second metric corresponds to the second wired upstream interface 223 of the multi-path AP (or the multi-path STB) 200. The MMS 214 of the multi-path AP (or the multi-path STB) 200 directs the device sub-driver 216 to route the data received from the personal computer through the second wired upstream interface 223 of the multi-path AP (or the multi-path STB) 200. The device sub-driver 216 is a software program that interacts with hardware of the first wired downstream interface 224 and hardware of the second upstream wired interface 223. The device sub-driver 216 directs the data available at the first wired downstream interface 224 (i.e., data that has come from the personal computer) to the second upstream wired interface 223. The second upstream wired interface 223 sends the data to the cable data network using the second IP address. The data eventually reaches the Internet backbone via the cable data network.

The personal computer is not aware of type of the data network and/or interface the multi-path AP (or the multi-path STB) 200 uses to send the data, which the multi-path AP (or the multi-path STB) 200 receives from the personal computer. The personal computer sends the data to the multi-path AP (or the multi-path STB) 200 in the first format prescribed by the multi-path AP (or the multi-path STB) 200. In the exemplary case the MMS 214 of the multi-path AP (or the multi-path STB) 200 selects the second upstream wired interface 223. The data received from the personal computer in the first format may have to be transcoded to a second format that is supported by the cable data network. The MMS 214 triggers the device sub-driver 216 to route the data available at the first wired downstream interface 224 (i.e., data that has come from the personal computer) to a transcoder. The transcoder is a constituent of the processing circuitry 202 of the multi-path AP (or the multi-path STB) 200. The transcoder converts the data in the first format to the second format. The MMS 214 further triggers the device sub-driver 216 to route the data in the second format from the transcoder to the second upstream wired interface 223. The second upstream wired interface 223 sends the data in the second format to the cable data network using the second IP address. The second upstream wired interface 223 comprises a transmission radio.

The MMS obtains the plurality of parameters and evaluates the four metric values periodically. The user using the user input interface 218 may set time interval between two consecutive metric evaluations by the MMS 214. The user input interface 218 receives a user defined time interval value and forwards the time interval value to the MMS 214. The MMS 214 stores the time interval value in the storage system 204 and evaluates the four metric values once in the user defined time interval. If at an instant of time the third metric value exceeds the second metric value, then the MMS 214 triggers the device sub-driver 216 to route the data received from the personal computer through the first wireless upstream interface 232 as the third metric corresponds to the first wireless upstream interface 232. The device sub-driver 216 directs the data available at the first wired downstream interface 224 (i.e., data that has come from the personal computer) to the first wireless upstream interface 232. The first wireless upstream interface 232 sends the data to the EDGE network using the third IP address. The data eventually reaches the Internet backbone via the EDGE network. The data, which was following the first wired downstream interface 224 to the second upstream wired interface 223 path, now after switching by the MMS 214, follows the first wired downstream interface 224 to the first wireless upstream interface 232 path. The MMS 214 controls switching of the data route such that no data (or data packets) is lost during switching.

Figure 3:
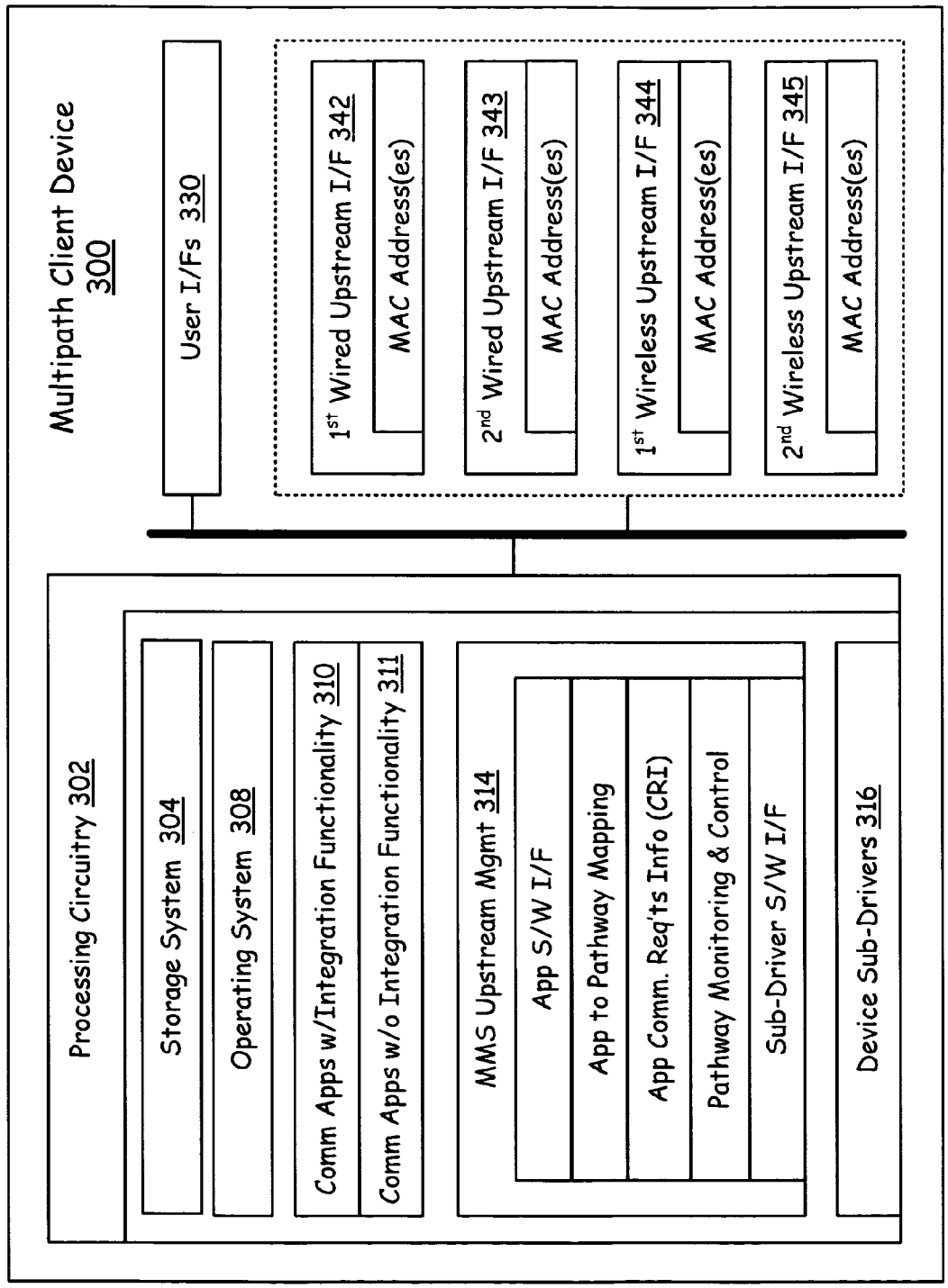
FIG. 3 is a schematic block diagram illustrating a plurality of components of a client device of FIG. 1, the client device supporting a plurality of data paths from the client device to a plurality of access points of FIG. 1.

FIG. 3 is a schematic block diagram illustrating a plurality of components of a client device 155 or 157 of FIG. 1, the client device supporting a plurality of data paths from the client device 155 or 157 to a plurality of access points 133, 135 and 137 of FIG. 1. Multi-path client device 300 comprises a processing circuitry 302, a storage system 304, a user input interface 330, a first wired upstream interface 342, a second wired upstream interface 343, a first wireless upstream interface 344, and a second wireless upstream interface 345. Each of the wired and wireless interfaces (342, 343, 344 and 345) interacts with at least a corresponding hardware device, and the corresponding hardware device is uniquely identified by a medium access control (MAC) address. The corresponding hardware device typically comprises a transceiver. The transceiver is used to send and receive data (i.e., packet data). An operating system 308, which is software, runs on the multi-path client device 300. Communication application software 310 or 311 runs on the multi-path client device 300. Multi-path upstream management software (MMS) 314 also runs on the multi-path client device 300. A device sub-driver program 316 runs on the multi-path client device 300.

The multi-path client device 300 associates itself with all available packet data networks. All the packet data networks are communicatively connected to Internet backbone. The multi-path client device 300 comprises four communication interfaces (342, 343, 344 and 345) and the multi-path client device 300 is able to associate itself with a maximum of four packet data networks of different types. For example and without limitation, the multi-path client device 300 associates itself with a first access point of a cable data network via the first wired upstream interface 342. Association with the first access point of the cable data network includes allocation of a first IP address by the first access point. The multi-path client device 300 uses the first IP address and the first wired upstream interface 342 to send data to the cable data network and receive data from the cable data network via the first access point. In this non-limiting example the multi-path client device 300 is associated with a second access point of a fiber data network via the second wired upstream interface 343 and a second IP address. The multi-path client device 300 is further associated with a third access point that belongs to a satellite data network via the first wireless upstream interface 344 and a third IP address. The multi-path client device 300 is additionally associated with a fourth access point of an UMTS data network via the second wireless upstream interface 345 and a fourth IP address. The second IP address, the third IP address and the fourth IP address are assigned to the multi-path client device 300 by the second access point (i.e.

the fiber data network), the third access point (i.e., the satellite data network) and the fourth access point (i.e., the UMTS network) respectively.

The user input interface 330 of the multi-path client device 300 may be a plurality of buttons, a keyboard, a touch screen, a mouse, a voice based interface, a pen, a thumbwheel etc. The multi-path client device 300 may a personal computer, a phone, a television, a headset, a video game box etc. If the multi-path client device 300 is a personal computer then the user input interface 330 is typically the mouse and the keyboard. If the multi-path client device 300 is a phone then the user input interface 330 is typically a screen and the plurality of buttons. If the multi-path client device 300 is a video game box then the user input interface 330 is typically the thumbwheel and a game pad. The multi-path client device 300 may send data to the Internet backbone. In this non-limiting example the multi-path client device 300 is a phone. The phone 300 receives a video selection via the plurality of buttons 330 (the user input interface). Without limitation, the video selection identifies a music video that is stored in an Internet server that is communicatively connected to the Internet backbone. The phone 300 is associated with (communicatively connected with) four access points, the first access point that belongs to the cable data network, the second access point that belongs to the fiber data network, the third access point that belongs to the satellite data network and the fourth access point that belongs to the UMTS network. All of the four access points are communicatively connected to the Internet backbone. The phone 300 now needs to send a request for the selected music video to the Internet backbone via any of the four access points.

The MMS 314 running on the phone 300 responds to the video selection by collecting a plurality of communication requirement information (CRI) corresponding to four pathways between the four access points and the corresponding four interfaces (342, 343, 344 and 345) of the phone 300. CRI corresponding to each of the four pathways may comprise maximum bandwidth supported by corresponding pathway, power requirement on the corresponding pathway, delay present in the corresponding pathway, congestion in the corresponding pathway and monetary cost of the corresponding pathway. A first CRI corresponding to the first wired upstream interface 342 may typically include maximum bandwidth supported by the cable data network, power required by the phone 300 to transmit and receive data on first pathway between the first access point and the first wired upstream interface 342, expected delay experienced by a packet data flowing through the first pathway, interference level on the first pathway, monetary cost involved in sending and receiving data over the first pathway. A second CRI, a third CRI and a fourth CRI corresponding to the second wired upstream interface 343, the first wireless upstream interface 344 and the second wireless upstream interface 345 respectively similarly reflects statistics related to the corresponding associations. At least one of the statistics constituting a CRI, typically the maximum bandwidth supported by an association remains unchanged as long as the association does not change. At least some of the statistics constituting the CRI, typically the delay present in a pathway and the interference level in the pathway vary with time even if the association does not change. The MMS 314 stores the collected plurality of communication requirement information (CRI) (i.e., the first CRI, the second CRI, the third CRI and the fourth CRI) in the storage system 304. The MMS 314 periodically updates the stored plurality of CRI by collecting the plurality of CRI periodically. The MMS 314 running on the phone 300 may collect the plurality of CRI from the four access points, the four interfaces of the phone 300 and the operating system 308 running on the phone 300.

The MMS 314 responds to the video selection request by collecting the plurality of CRI corresponding to the four pathways. The MMS may respond to the video selection by retrieving stored values of the plurality of CRI from the storage system 304. The communication application software running on the multi-path client device 300 presents the plurality of CRI collected by the MMS 314 to the user. The communication application software (310 or 311) may display the plurality of CRI on the screen (i.e., the user input interface 330) of the phone 300. The communication application software 311 may be any standard Internet browser application program (IE, Firefox) that runs on a single-path client device. The communication application software 310 is software such as the communication application software 311 that has been modified to add a plurality of extra features supporting the multi-path management process. Thus, link selection and seamless switching over time is performed with knowledge of the communication application software 311. The communication application software 311 is made aware, and, more importantly, can assist the process. For example, the communication application software 311 may communicate current and future demands and requirements directly and on an ongoing basis to the multi-path management process to assist the selection and management process. With either the software 310 and 311, the user may be offered the four pathways for selection based on the plurality of CRI displayed on the screen of the phone 300. The communication application software (310 or 311) responds to pathway selection made by the user by informing the MMS 314 about the pathway selection.

In this exemplary case, the pathway selection identifies pathway corresponding to the second wired interface 343. The second wired interface 343 in this exemplary case is associated with the second access point that belongs to the fiber data network. The MMS 314 running on the phone 300 directs the device sub-driver 316 to route all future data transmission to and reception from the Internet backbone via the second wired interface 343. The sub-driver 316 is software that drives all hardware devices corresponding to the first wired upstream interface 342, the second wired upstream interface 343, the first wireless upstream interface 344, and the second wireless upstream interface 345. The hardware devices are uniquely identified by their MAC addresses. The phone 300, in response to the video selection, needs to send a request for the selected music video to the Internet backbone. The sub-driver 316 directs a first data containing the request for the selected music video to flow out of the second wired interface 343. The second wired interface 343 (i.e., hardware associated with the second wired interface 343) sends the first data to the second access point using the second IP address. The request for the selected music video eventually reaches the Internet backbone via the user-selected pathway (i.e., the pathway corresponding to the second wired interface 343).

In this exemplary case, the Internet server having the selected music video responds to the request by sending the selected music video to the Internet backbone. The phone 300 is instructed by the MMS 314 and the sub-driver 316 to receive the selected music video from the Internet backbone via the user-selected pathway. The second wired interface 343 receives the selected music video from the second access point (that is connected to the Internet backbone via the fiber data network) using the second IP address.

Data traffic in the four packet data networks change with time and consequently the plurality of CRI change with time.

The MMS 314 running on the phone as 300 collects the plurality of CRI at regular intervals while the phone 300 receives the selected music video via the second wired interface 343. The interval at which the MMS 314 collects the plurality of CRI is a preset value. In this exemplary case, interference level on the user-selected second pathway increases with time. The MMS 314 may be adapted to respond whenever the interference level on the user-selected pathway exceeds an upper limit. The upper limit may be a preset value. If at an instant of time the interference level on the second pathway exceeds the upper limit, the MMS 314 running on the phone 300 looks up into the most recently collected plurality of CRI and selects an alternate pathway that has least interference among remaining three pathways (i.e., pathway via the first wired upstream interface 342, pathway via the first wireless upstream interface 344 and pathway via the second wireless upstream interface 345). As an example and without limitation, the pathway via the first wireless upstream interface 344 has the least interference at the instant of time. The MMS 314 directs the sub-driver 316 to receive and transmit data via the first wireless upstream interface 344 instead of the second wired upstream interface 342. The sub-driver 316 directs hardware associated with the first wireless upstream interface 344 to receive the selected music video from the Internet backbone. The first wireless upstream interface 344 is associated with the third access point that belongs to the satellite data network. The hardware associated with the first wireless upstream interface 344 may send a request message to the satellite data network and to the Internet server requesting the Internet server to send the selected music video via the satellite data network. The selected music video may reach the third access point via the satellite data network. The phone 300 receives the selected music video via the first wireless upstream interface 344 using the third IP address. The sub-driver 316 directs the hardware associated with the second wired upstream interface 343 to stop receiving the selected music video. The MMS 314 and the sub-driver 316 control a switching of pathway at the instance of time, from a high interference pathway to a lowest interference pathway without any loss of data.

The MMS 314 may be additionally adapted to respond whenever the delay in the user-selected pathway exceeds an upper limit.

In the exemplary case, the MMS 314 and the sub-driver 316 route data via the user-selected pathway. In another embodiment, whenever an application running on the phone 300 needs to send and/or receive data from the Internet backbone, the MMS 314 looks up into the most recently collected values of the plurality of CRI and selects a pathway from the four available pathways. The selection made by the MMS 314 may depend on type of data to be sent or received from the Internet backbone. For example and without limitation, the application is a multimedia gaming application. The multimedia gaming application calls for downloading of high volume of data and also calls for real time operation. The MMS 314 running on the phone 300 responds to the multimedia gaming application requirement by looking up into the most recently collected values of the plurality of CRI and selecting a pathway that offers highest bandwidth among the four available pathways. In this example, pathway between the second access point and the second wired upstream interface 343 offers the highest bandwidth among the four available pathways. The MMS 314 running on the phone 300 directs the device sub-driver 316 to route all future data transmission and reception from the Internet backbone required by the multimedia gaming application via the second wired upstream interface 343. Data transmission and reception from the Internet backbone to the phone 300 passes through the fiber data network.

In yet another embodiment, for example and without limitation, the application is a voice over IP (VoIP) application. The VoIP application calls for transmission and reception of voice packets from the Internet backbone. The MMS 314 running on the phone 300 may respond to the VoIP application requirement by looking up into the most recently collected values of the plurality of CRI and selecting a pathway that offers minimum delay among the four available pathways. In this example, pathway between the fourth access point and the second wireless upstream interface 345 offers the least delay among the four available pathways. The MMS 314 running on the phone 300 directs the device sub-driver 316 to route data transmission and reception required by the VoIP application from the Internet backbone via the second wireless upstream interface 345. Data transmission and reception from the Internet backbone to the phone 300 passes through the WiMax network.

Figure 4:
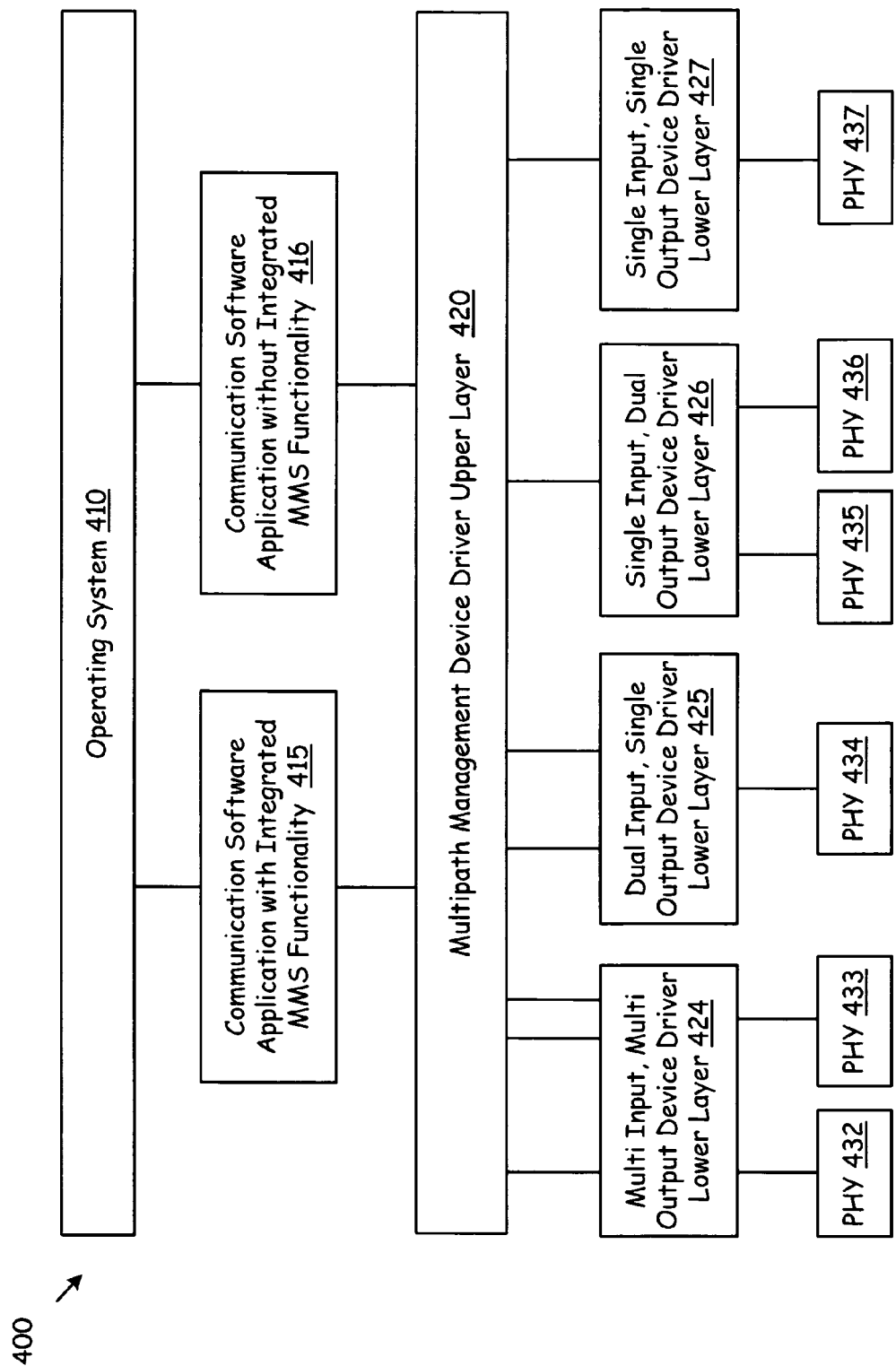
FIG. 4 is a schematic block diagram illustrating a plurality of software running on a client device, the client device supporting a plurality of data paths from the client device to a plurality of access points.

FIG. 4 is a schematic block diagram illustrating a plurality of software running on a client device 400, the client device 400 supporting a plurality of data paths from the client device 400 to a plurality of access points. The client device 400 may be a computer, a video game box, a phone, a television and a set top box, a headset or any of a variety of a device that runs at least an application that requires transmission and reception of data packets from Internet. If the client device 400 is the computer, then for example and without limitation, the at least an application running on the computer 400 may be an Internet browsing (i.e., Web browsing) application that runs on layer 7 of OSI/ISO protocol stack. A user typically interacts with the Internet browsing application via a Web Browser (i.e., Internet Explorer, Netscape Navigator, Mozilla Firefox, etc.) displayed on a screen of the computer 400. The Internet browsing application running on the computer 400 responds to user selection entered via a user input interface (typically a keyboard and a mouse) by triggering a communication interface (i.e., typically layer 2 and/or layer 1 of OSI/ISO protocol stack) of the computer 400 to send a request to the Internet for an archived data (e.g., a web page) that is identified by the user selection. Lower layer hardware and software running on the computer 400 (i.e., layer 6, layer 5, layer 4, layer 3, layer 2 of OSI/ISO protocol stack) encapsulates the request in a first plurality packets and the communication interface of the computer 400 sends the first plurality of packets to the Internet. The communication interface of the computer 400 also receives a second plurality of packets that contain the requested archived data (i.e., web page), from the Internet. In this exemplary case the data packets refer to the first plurality of packets and the second plurality of packets. The lower layer hardware and software running on the computer 400 (i.e., layer 6, layer 5, layer 4, layer 3, layer 2 of OSI/ISO protocol stack) extracts the received archived data from the second plurality of packets and forwards the received archived data to the Internet browsing application (i.e., layer 7 of OSI/ISO protocol stack). The Internet browsing application displays the received archived data i.e., the requested web page on the screen of the computer 400.

The at least an application running on the computer 400 may be an Internet telephony application. A first user is sending and receiving voice information from a second user using a destination device. The Internet telephony application is also running on the destination device. The destination device is communicatively connected to the Internet. In such a case, the first plurality of packets comprise voice of the first user using the computer 400. The second plurality of packets comprise voice of the second user using the destination device.

If the client device 400 is the television and the set top box, then for example and without limitation, the at least an application running on the television and the set top box 400 may be a television program viewing application. In such a case the first plurality of packets comprise a request for a television program (recorded or live multimedia information, such as a news program, a football game, a music program etc.) sent to the Internet and the second plurality of packets comprise the requested television program.

The client device 400 comprises a plurality of communication interfaces. The client device 400 communicates with a plurality of access points via the plurality of data paths. The plurality of access points belong to a plurality of heterogeneous packet data networks. For example and without limitation, the client device 400 comprises three communication interfaces, a wired interface, a first wireless interface and a second wireless interface. The client device 400 associates itself with available access points when the client device is turned on. An access point comprises a transceiver that receives data packets from the client device 400 and sends the received data packets to a corresponding packet data network. Again the access point receives data packets from the corresponding packet data network and sends the received data packets to the client device 400.

For example and without limitation, at a first instant of time, the client device 400 is collocated with a first access point belonging to a fiber data network, a second access point belonging to an IEEE 802.11 network, a third access point belonging to a WiMax network and a fourth access point belonging to a satellite data network. A fiber cable is plugged into the wired interface of the client device 400. The client device 400 associates itself with the first access point, the second access point and the third access point, via the wired interface, the first wireless interface and the second wireless interface respectively, when the client device is turned on. The first access point allocates a first IP to the wired interface of the client device 400. The client device 400 is able to communicate with the fiber data network via the wired interface and the first access point and using the first IP address. The second access point allocates a second IP to the first wireless interface of the client device 400. The client device 400 is able to communicate with the IEEE 802.11 network via the first wireless interface and the second access point and using the second IP address. The third access point allocates a third IP to the second wireless interface of the client device 400. The client device 400 is able to communicate with the WiMax network via the second wireless interface and the third access point and using the third IP address. The plurality of access points with which the client device 400 communicates is the first access point, the second access point and the third access point. The plurality of data paths refer to a first data path between the wired interface and the first access point, a second data path between the first wireless interface and the second access point and a third data path between the second wireless interface and the third access point. The plurality of heterogeneous packet data networks refer to the fiber data network, the IEEE 802.11 network and the WiMax network.

An operating system 410 (for e.g., Windows XP, Unix, Linux etc.) running on the client device 400 interacts with a communication software application program. The communication software application 416 may be a standard Web browsing application (e.g. IE, Netscape Navigator, Mozilla Firefox, etc.). A multi-path management software 420 (MMS) runs on the client device 400. The MMS 420 controls and monitors communication between the client device 400 and the plurality of access points via the plurality of data paths. The communication software application 415 may be the standard Web browsing application with a plurality of additional features. The additional features allow a user using the client device 400 to interact with the MMS 420.

The MMS 420 controls a plurality of lower layer device drivers (424, 425, 426 and 427). The lower layer device driver is software that drives hardware associated with one or more of the plurality of communication interfaces (i.e., the wired interface, the first wireless interface, and the second wireless interface) of the client device 400. A single input single output (SISO) lower layer device driver 437 accepts data packets via a single input line from the MMS 420. The SISO device driver 427 controls exchange of data packets over a single data path. For example, SISO device driver 427 drives hardware associated with the first wireless interface. The first wireless interface is associated with the IEEE 802.11 network at the first instance of time. The SISO device driver 427 accepts the data packets via the single input line from the MMS 420. The MMS 420 embeds the second IP address assigned by the IEEE 802.11 network to the first wireless interface in the data packets. The SISO device driver 427 directs a transmitter associated with the first wireless interface to transmit the data packets. The data packets transmitted by the transmitter associated with the first wireless interface are embedded with the second IP address. Consequently the second access point that belongs to the IEEE 802.11 network receives the data packets transmitted by the transmitter. The SISO device driver 427 directs a receiver associated with the first wireless interface to look out for any data packet embedded with the second IP address. When the receiver associated with the first wireless interface senses a data packet embedded with the second IP address, the receiver receives the data packet and forwards the data packet to the SISO device driver 427. The SISO device driver 427 forwards the received data packet to the MMS 420.

The MMS 420 directs the SISO device driver 427 to collect a plurality of statistics related to the single data path, exchange of data packets over which is controlled by the SISO device driver 427. Physical layer 437 refers to the single data path that the SISO device driver 427 controls. The plurality of statistics may include delay in the data path, the signal to noise ratio on the data path, power required by the transmitter associated with the first wireless interface to maintain a predefined bit error rate on the data path. The SISO device driver 427 may request the second access point to supply some or all of the plurality of statistics, and the SISO device driver 427 may subsequently forward statistics received from the second access point to the MMS 420. The SISO device driver 427 may measure some or all of the plurality of statistics by sending and receiving a training packet data.

The SISO device driver 427 collects the plurality of statistics related to the single data path at regular intervals of time. As an example and without limitation, the MMS 420 receives the plurality of statistics at a second instance of time and determines that the delay in the single data path is more than a preset threshold value. The MMS 420 may direct the SISO device driver 427 to change association and switch to a new association. The SISO device driver 427 directs the first wireless interface to look out for access points belonging to wireless packet data networks other than the IEEE 802.11 network. The first wireless interface may now associate itself with the third access point that belongs to the WiMax network. The WiMax network may allocate a fourth IP address to the first wireless interface. The SISO device driver 427 now controls exchange of data packets over a different path between the first wireless interface and the third access point that belongs to the WiMax network. Switching of pathway is triggered and managed by the MMS 420 and such switching may take place even when the first wireless interface is not transmitting or receiving any packet data from the Internet (except control data and data containing some or all of the plurality of statistics). The MMS 420 may direct the SISO device driver 427 to collect a second plurality of statistics related to the different path, exchange of data packets over which is controlled by the SISO device driver 427 from the second instance of time onwards.

A single input dual output (SIDO) lower layer device driver 426 accepts data packets via a single input line from the MMS 420. The SIDO device driver 426 controls exchange of data packets over a first path 435 and a second path 436. For example, SIDO device driver 426 drives a first hardware associated with the wired interface and a second hardware associated with the first wireless interface. The wired interface is associated with the fiber data network and the first wireless interface is associated with the IEEE 802.11 network at the first instance of time. The SIDO device driver 426 accepts the data packets via the single input line from the MMS 420. The MMS 420 directs the SIDO device driver 426 to collect a first plurality of statistics related to the first path 435 between the wired interface and the first access point that belongs to the fiber data-network. The MMS 420 also directs the SIDO device driver 426 to collect a second plurality of statistics related to the second path 436 between the first wireless interface and the second access point that belongs to the IEEE 802.11 network. The MMS 420 selects one of the first path 435 and the second path 436 using the first plurality of statistics and the second plurality of statistics. The MMS 420 may be adapted to select a path that offers lowest interference at a given instance of time. The MMS 420 may be alternately adapted to select a path that offers highest bandwidth at a given instance of time.

For example and without limitation, the second path 436 offers a higher bandwidth than the first path 435. The MMS 420 embeds the second IP address assigned by the IEEE 802.11 network to the first wireless interface in data packets before sending the data packets to the SIDO device driver 426. The MMS 420 directs the SIDO device driver 426 to direct the data packets via the second path 436. The SIDO device driver 426 directs the second hardware associated with the first wireless interface to transmit the data packets. The data packets transmitted by the second hardware associated with the first wireless interface are embedded with the second IP address. Consequently the second access point that belongs to the IEEE 802.11 network receives the data packets transmitted by the transmitter. The SIDO device driver 426 directs the second hardware to look out for any data packet embedded with the second IP address. When the second hardware senses a data packet embedded with the second IP address, the second hardware receives the data packet and forwards the data packet to the SIDO device driver 426. The SIDO device driver 426 forwards the received data packet to the MMS 420.

At a second instance of time the client device 400 moves to a new location. The association with the second access point is lost. The first wireless interface looks out for available wireless packet data networks. As an example, the first wireless interface associates with a fourth access point belonging to the IEEE 802.11 network. The fourth access point allocates a fourth IP to the first wireless interface. The second path 436 now refers to a communication path between the first wireless interface and the fourth access point. The MMS 420 directs the SIDO device driver 426 to collect a first plurality of statistics related to the first path 435 and a third plurality of statistics related to the new second path 436. The MMS 420 determines that at the second instance of time, the first path 435 between the wired interface and the first access point offers higher bandwidth than the new second path 436. The MMS 420 subsequently directs the SIDO device driver 426 to route data packets via the first path 435 and stop transmitting and receiving data packets via the new second path 436. The MMS 420 embeds the first IP address assigned by the first access point belonging to the fiber data network in data packets before sending the data packets to the SIDO device driver 426, so that the SIDO device driver 426 directs the data packets via the first path 435.

A multiple input multiple output (MIMO) device driver 424 accepts data packets via three input lines from the MMS 420, i.e., the MIMO device driver 424 accepts data packets generated by three different applications running on the control device 400. The MIMO device driver 424 controls exchange of data packets over a first path 432 and a second path 433. For example, MIMO device driver 424 drives a first hardware associated with the first wireless interface and a second hardware associated with the second wireless interface. The first wireless interface is associated with the second access point that belongs to the IEEE 802.11 network and the second wireless interface is associated with the third access point that belongs to the WiMax network at the first instance of time. The MIMO device driver 424 accepts the data packets via the three input lines from the MMS 420. For example, a gaming application, a Web browsing application and an Internet telephony application is running on the client device 400. The MIMO device driver 424 accepts a first plurality of data packets corresponding to the gaming application, a second plurality of data packets corresponding to the Web browsing application and a third plurality of data packets corresponding to the Internet telephony application via the three input lines.

The MMS 420 selects a higher bandwidth path from the first path 432 and the second path 433 and directs the MIMO device driver 424 to route the first plurality of data packets corresponding to the gaming application through the higher bandwidth path. If the gaming application is not running on the control device at a second instance of time, then the MMS 420 directs the MIMO device driver 424 to route the third plurality of data packets corresponding to the Internet telephony application through the higher bandwidth path. For example and without limitation, at a third instance of time the second path 433 between the second wireless interface and the third access point that belongs to the WiMax network goes down. The second wireless interface now associates itself with a fifth access point that belongs to the IEEE 802.11 network. The first path 432 refers to a path between the first wireless interface and the second access point that belongs to the IEEE 802.11 network. The second path 433 refers to a path between the second wireless interface and the fifth access point that belongs to the IEEE 802.11 network.

At the third instance of time, both the first path 432 and the second path 433 offer same bandwidth. Now the MMS 420 may direct the direct the MIMO device driver 424 to route the first plurality of data packets corresponding to the gaming application through the lower interference path. The MMS 420 controls selection of a path from a plurality of paths (for e.g., the first path 432 and the second path 433) and maintains exchange of data packets over the selected path by directing the lower layer device driver (one or more of 424, 425, 426 and 427) to interact with the corresponding hardware (for e.g., transmitter and receiver) appropriately. The MMS 420 and the lower layer device driver (one or more of 424, 425, 426 and 427) may retrieve a plurality of statistics corresponding to the plurality of paths and use the plurality of retrieved statistics to seamlessly switch to a new path for the exchange of data packets.

Figure 5:
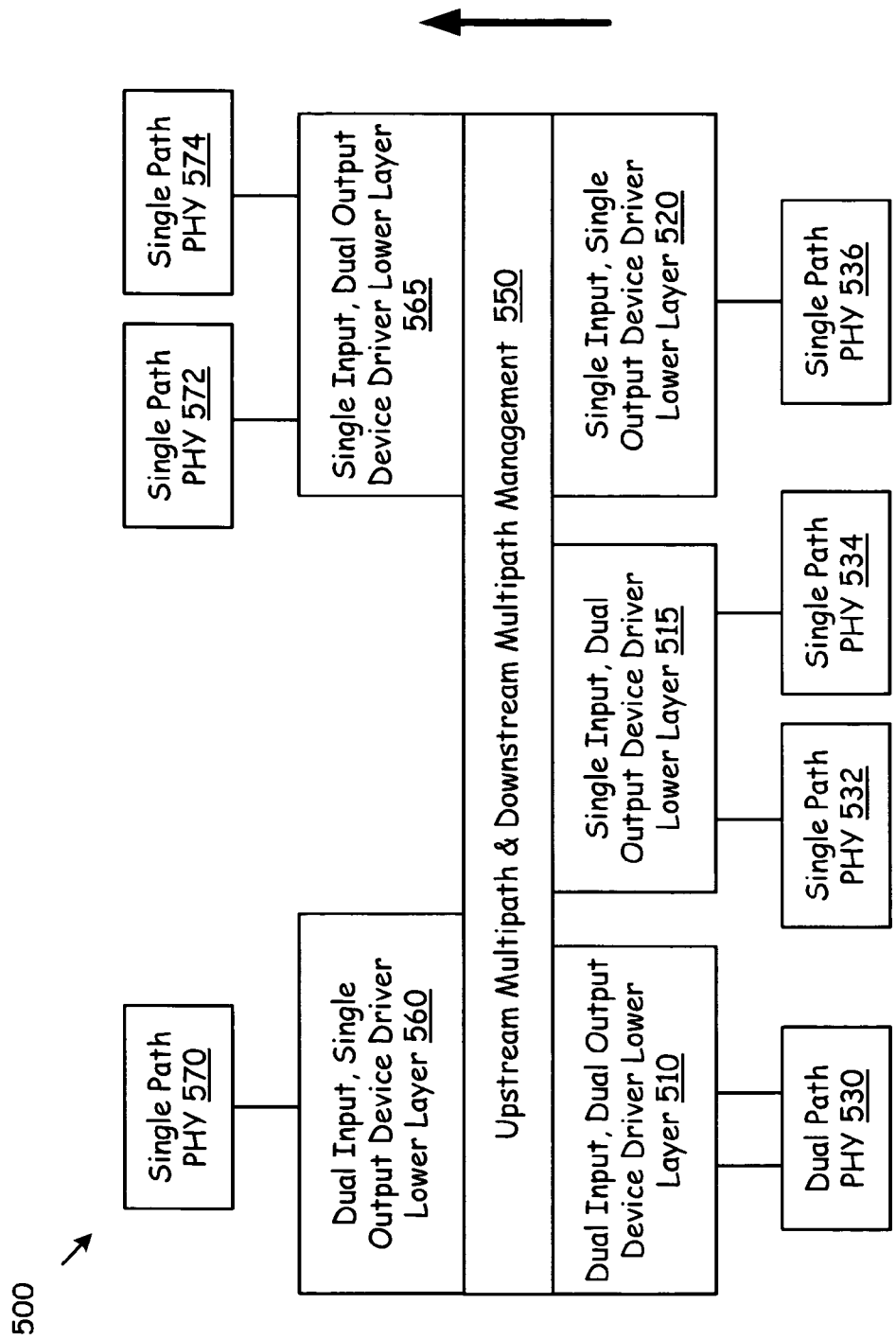
FIG. 5 is a schematic block diagram illustrating a plurality of software running on an access point, the access point supporting a first plurality of data paths from the access point to a plurality of client devices and supporting a second plurality of data paths from the access point to a packet switched network.

FIG. 5 is a schematic block diagram illustrating a plurality of software running on an access point 500, the access point 500 supporting a first plurality of data paths from the access point 500 to a plurality of client devices and supporting a second plurality of data paths from the access point to a packet switched network. The access point 500 is associated with the packet switched network and the plurality of client devices. The access point and the packet switched network may agree upon a protocol and the access point uses the protocol to communicate with the packet switched network. The access point assigns a plurality of IP addresses to the plurality of client devices. The access point 500 comprises at least a transceiver that receives a first plurality of data packets from the packet switched network via one of the second plurality of data paths, identifies a client device from the plurality of client devices, that the first plurality of data packets are destined for, and sends the received data packets to the identified client device. The transceiver in addition receives a second plurality of data packets from one or some of the plurality of access points and sends the second plurality of data packets to the packet switched network via the one of the second plurality of data paths. A multi-path management software (MMS) 550 running on the access point 500 selects the one of the second plurality of data paths for data packet exchange between the access point and the packet data network.

For example and without limitation, the access point 500 is associated with a WiMax network via a first pathway 570, a second pathway 572 and a third pathway 574. The second plurality of data paths refer to the first pathway 570, the second pathway 572 and the third pathway 574. A Dual Input Single Output (DISO) device driver 560 is software that drives a first hardware circuitry corresponding to the first pathway 570. The first hardware circuitry corresponding to the first pathway 570 comprises at least a first transceiver that is adapted to transmit and receive data packets over the first pathway 570. In this example, the first pathway 570 is a first wireless path between the access point 500 and a hub or a switch or another access point that belongs to the WiMax network. Data packets flowing via the first pathway 570 obey WiMax protocol. The WiMax network assigns a first IP address to the first pathway 570. The DISO device driver 560 accepts data packets from the MMS 550 via a first input path and a second input path. The DISO device driver 560 is adapted to direct data packets coming via one of the first input path and the second input path to the first hardware circuitry corresponding to the first pathway 570.

The MMS 550 may direct the DISO device driver 560 to collect a first communication requirement information (CRI) corresponding to the first pathway 570. The first CRI may comprise IP address assigned by the WiMax network to the first pathway 570 (i.e., the first IP address), delay on the first pathway 570, traffic on the first pathway 570, monetary cost of the first pathway 570, number of hops the first pathway 570 uses etc. The first CRI changes with time. The MMS 550 may direct the DISO device driver 560 to collect the first CRI periodically. The MMS 550 may receive the first CRI from the DISO device driver 560 and store the first CRI in a storage system of the access point 500. The MMS 550 may alternately retrieve the first CRI from a second storage system as and when required. One or more components of the first CRI may be factory default values, stored in the storage system of the access point 500.

A Single Input Dual Output (SIDO) device driver 565 is a software that drives a second hardware circuitry corresponding to the second pathway 572 and also drives a third hardware circuitry corresponding to the third pathway 574. The second and the third hardware circuitry comprise respectively at least a second transceiver and a third transceiver, which are adapted to transmit and receive data packets over the second pathway 572 and the third pathway 574 respectively. In this example, the second pathway 572 and the third pathway 574 are respectively a second wireless path and a third wireless path between the access point 500 and the same or a different hub or switch of the WiMax network. The WiMax network assigns a second IP address and a third IP address to the second pathway 572 and the third pathway 574 respectively. The SIDO device driver 565 accepts data packets from the MMS 550 via a single input path and is adapted to direct data packets coming via the single input path to either the second hardware circuitry corresponding to the second pathway 572 or the third hardware circuitry corresponding to the third pathway 574 under supervision of the MMS 550. The MMS 550 may direct the SIDO device driver 565 to collect a second CRI and a third CRI corresponding to the second pathway 572 and the third pathway 574 respectively periodically and forward the second CRI and the third CRI to the MMS 550. The MMS 550 may alternately retrieve the second CRI and the third CRI from the second storage system as and when required.

In the exemplary case, the MMS 550 is adapted to direct packet data generated by any application running on the client device 500 via a pathway that offers least delay among the first pathway 570, the second pathway 572 and the third pathway 574. For example and without limitation, a video downloading application is running on the client device 500. The video downloading application calls for downloading (receiving) of an archived video file from Internet. The access point 500 is connected to the Internet via the WiMax network. The client device 500 may connect to the WiMax network via any one of the first pathway 570, the second pathway 572 and the third pathway 574. The MMS 550 running on the access point 500 has the first CRI, the second CRI and the third CRI. The MMS 550 uses the first CRI, the second CRI and the third CRI to determine the pathway that offers least delay among the first pathway 570, the second pathway 572 and the third pathway 574. For example, the second pathway 572 offers the least delay. The MMS 550 directs the SIDO device driver 565 to receive data packets corresponding to the archived video file from the Internet via the second pathway 572. The SIDO device driver 565 directs the second hardware corresponding to the second pathway to receive the data packets corresponding to the archived video file from the Internet. The SIDO device driver 565 forwards the received data packets to the MMS 550 and the MMS 550 sends the received data packets to the video downloading application.

For example and without limitation, a Dual Input Dual Output (DIDO) device driver 510 drives a fifth hardware and a sixth hardware corresponding to a dual path 530. A first client device is communicatively connected to the fifth hardware and the sixth hardware of the access point 500 via the dual path 530. The MMS 550 directs the DIDO device driver 510 to collect CRI corresponding to the dual path 530. The first client device, whenever wants to send or receive data packets from the access point, sends a request to the access point. The MMS 550 in response to the request from the client device selects one path from the dual path 530 using the CRI corresponding to the dual path 530. The MMS 550 directs the client device to use the selected path from the dual path 530 to send and receive data packets from the access point. The MMS 550 directs the DIDO device driver 510 to use hardware corresponding to the selected path to receive and transmit the data packets to the first client device.

Figure 6:
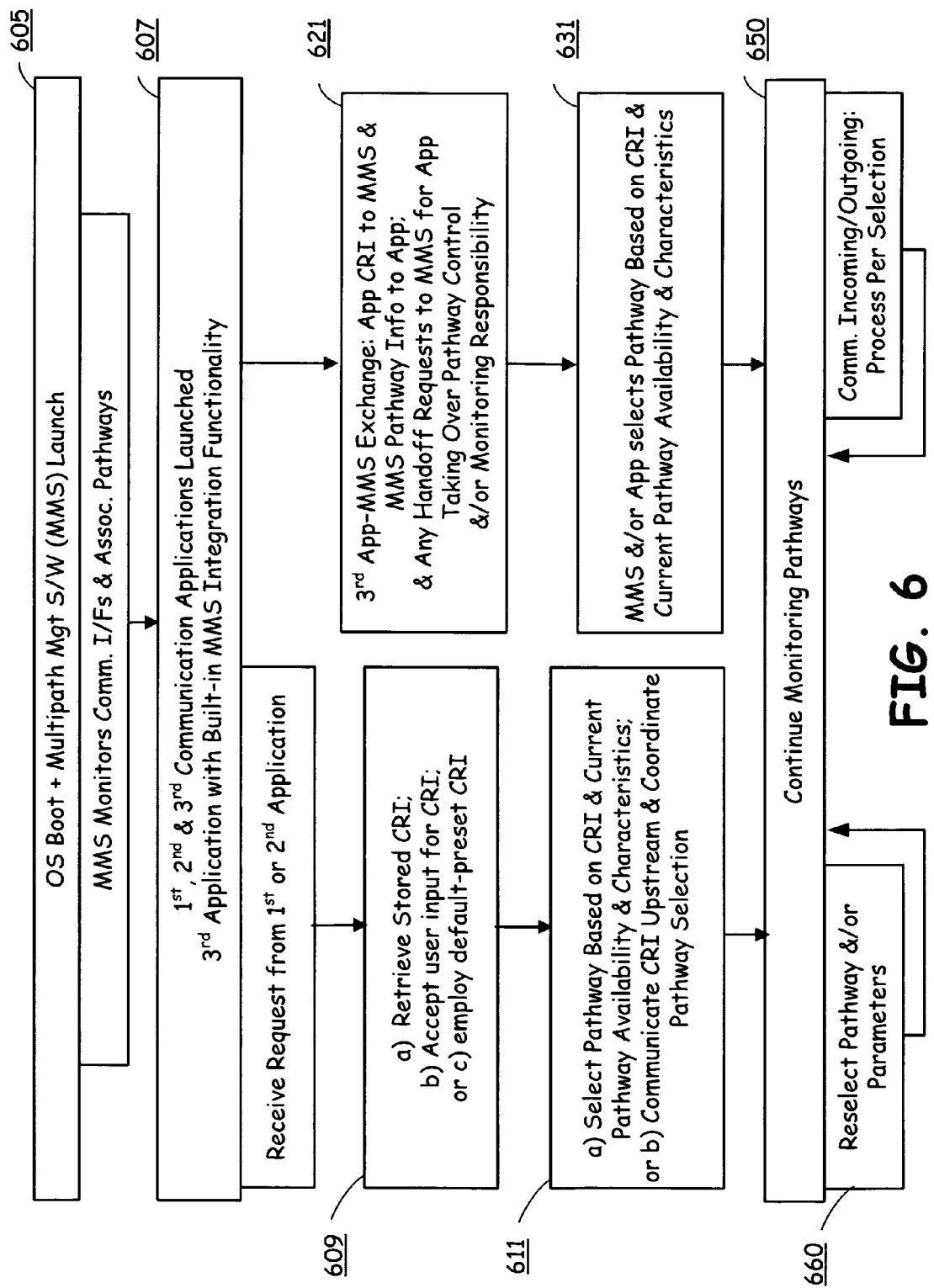
FIG. 6 is a flow chart illustrating a method of managing a plurality of communication pathways between a computing device and at least one packet data network by a multi-path management software that is running on the computing device.

FIG. 6 is a flow chart illustrating a method of managing a plurality of communication pathways between a computing device and at least one packet data network by a multi-path management software (MMS) that is running on the computing device. The computing device may be a personal computer, a phone, a set top box associated with a television, an access point that belongs to a packet data network or any of a variety of devices that is capable of communicating with a packet data network. The at least one packet data network may be a cable network, a fiber optic network, a satellite data network, a WiMax network, an IEEE 802.11 network, an UMTS network, a GPRS network, a CDMA network or any of a variety of standard or proprietary data network that is capable of transporting data fragmented into packets. The data refers to one or more of a video, an audio, a music video, a video game, a voice conversation, a picture, a text message, a television program and any live or archived multimedia information.

The computing device is turned on and an operating system (OS) of the device (for e.g., Windows XP, Linux, Unix, etc.) starts booting in block 605. The operating system (OS) launches the multi-path management software (MMS) in the block 605. The computing device comprises a plurality of communication interfaces. As the computing device is turned on, the computing device starts associating each of the communication interfaces to at least one packet data network. If the computing device is an access point then the computing device may try to associate each of the communication interfaces to the same packet data network. If the computing device is a client device, for e.g., a personal computer, a phone, a headset, then the computing device may try to associate the communication interfaces to a variety of packet data networks. The computing device may be a personal computer and the personal computer may have a first communication interface, a second communication interface and a third communication interface. The personal computer upon being turned on may associate the first communication interface with a first access point belonging to the IEEE 802.11 network. A first communication pathway is thus set up between the first communication interface and the first access point belonging to the IEEE 802.11 network. The personal computer may in addition associate the second communication interface with a second access point belonging to the WiMax network. A second communication pathway is thus set up between the second communication interface and the second access point belonging to the WiMax network. The personal computer may associate the third communication interface with a third access point belonging to the UMTS network. A third communication pathway is thus set up between the third communication interface and the third access point belonging to the UMTS network. In this example the first, the second and the third communication interfaces are wireless interfaces. One or more of the first, second and the third communication interface may be a wired interface. In such a case the personal computer may associate the wired interface with a wired packet data network. The plurality of communication pathways refer to the first, the second and the third communication pathway. The MMS running on the personal computer manages the first, the second and the third communication pathway.

The MMS after being launched starts analyzing and monitoring the plurality of communication interfaces of the computing device (the client device or the access point) and the plurality of associated communication pathways as shown in the block 605. In a next step 607, a first communication application, a second communication application and a third communication application are being launched. The first communication application and the second communication application may correspond to Internet browsing. The MMS receives request for a first web page and a second web page from the first communication application and the second communication application respectively as shown in the block 607. The third communication application comprises built-in multi-path management functionality.

For example and without limitation, the first communication application may require at least a minimum data rate communication pathway. A first communication requirement information (CRI) i.e., the required minimum data rate, corresponding to the first communication application may be stored in a storage system. The MMS retrieves the first CRI from the storage system in a next step 609. If the first CRI is not available in the storage system then the MMS prompts a user to enter first CRI in the step 609. The MMS receives the first CRI entered by the user via a user input interface of the computing device. The user input interface of the computing device may be a keyboard, a mouse, a touch screen, a plurality of buttons etc. If the user does not enter the first CRI in the step 609, then the MMS analyzes the request from the first communication application (i.e., the request for the first web page) and determines the first CRI (i.e., the minimum bandwidth the first communication application will be assigned) in the step 609. The MMS attempts to assign the minimum bandwidth specified in the first CRI to the first communication application in step 611. The MMS collects directly or indirectly a second CRI corresponding to the second communication application in the step 609. The second CRI may comprise a maximum delay the second communication application may withstand and a minimum signal to interference ratio the second communication application may require. If the computing device is an access point, i.e., the MMS is running not on the personal computer but, for example, on the first access point, then the MMS running on the first access point receives the first CRI corresponding to the first communication application from the personal computer via the first communication pathway in the step 609.

In the step 611, the MMS determines that the first communication pathway between the personal computer (the computing device) and the first access point, the second communication pathway between the personal computer and the second access point and the third communication pathway between the personal computer and the third access point are available for transporting data packets to and from Internet. The MMS selects a pathway that satisfies the first CRI from the three available communication pathways in the step 611. There may be more than one pathway that satisfies the first CRI. The MMS may be adapted to select the pathway from the more than one pathway randomly. The MMS directs the personal computer to use the selected pathway for sending and receiving data packets generated or required by the first communication application from the Internet until further instruction from the MMS in the step 611. The personal computer sends the request for the first web page (in form of data packets) to the Internet via the selected pathway in the step 611. The personal computer receives the requested web page (in form of data packets) from the Internet via the selected pathway.

The computing device may be an access point. The access point supports a plurality of communication pathways between the access point and the Internet. If the computing device is the first access point, i.e., the MMS is running not on the personal computer but, on the first access point, then the MMS running on the first access point selects a pathway, that satisfies the first CRI, from the plurality of communication pathways. The first access point receives the request for the first web page (in form of data packets) from the personal computer and sends the received request to the Internet via the selected pathway in the step 611. The first access point receives the requested web page (in form of data packets) from the Internet via the selected pathway and sends the received web page to the personal computer. The MMS running on the computing device (the personal computer or the first access point) selects a second pathway that satisfies the second CRI, from the plurality of available pathways, and directs the second communication application to use the selected pathway for exchange of data packets with the Internet.

The MMS running on the computing device (the personal computer or the first access point) monitors the selected pathway and other available communication pathways periodically. If the pathway used by the first communication application fails to satisfy the first CRI at an instance of time then in a next step 660, the MMS selects a different pathway that satisfies the first CRI from the other available communication pathways and directs the first communication application to use the different pathway for exchange of data packets instead of the earlier pathway until further instruction from the MMS. The earlier pathway may fail to offer the minimum data rate the first communication application requires (as specified in the first CRI) at the instance of time because of an increase in data traffic in the earlier pathway. The MMS continues monitoring all available pathways between the computing device and the Internet periodically. The MMS similarly periodically monitors pathway used by the second communication application in the step 650 and directs change of pathway depending on the second CRI and health and/or characteristics of the pathway (for e.g., bandwidth offered by the pathway, delay present in the pathway, data traffic flowing through the pathway etc.) in the step 660. The MMS may direct change of pathway for the second communication application because delay in the pathway might have crossed an upper limit specified in the second CRI.

The third communication application that has built-in multi-path management functionality is launched in the step 607. The third communication application may need to satisfy a plurality of communication requirements. For example, the third communication application may ask for a very low power and low interference communication pathway. The third communication application sends a third CRI (i.e., the maximum power requirement and the maximum interference requirement of the third communication application) corresponding to the third communication application to the MMS in a step 621. In the step 631, the MMS selects a pathway from the plurality of available pathways between the computing device and the Internet (or access point if the computing device is not an access point, but a client device) such that the selected pathway satisfies the third CRI. The MMS directs the computing device to use the selected pathway for sending and receiving data packets generated and/or required by the third communication application from the Internet in the step 631. The MMS monitors the selected pathway as shown in the step 650 and directs a change in pathway if necessary. In the step 621 the MMS may have selected a pathway that requires the lowest power among the plurality of available pathways. The selected pathway offers an interference that is less than the maximum allowed interference level specified by the third CRI. At a second instance of time the interference in the selected pathway may exceed the maximum allowed interference level. The MMS directs the third communication application to use a second pathway that offers interference less than the maximum allowed interference level. However the second pathway may require more power than the earlier selected pathway.

In the step 621, the third communication application with the built-in multi-path management functionality may override the MMS and may perform the selection of pathway satisfying the third CRI. The third communication application uses the selected pathway for exchange of data packets until the selected pathway stops fulfilling communication requirements corresponding to the third communication application. The third communication application then triggers a change in pathway as shown in block 650.

Figure 7:
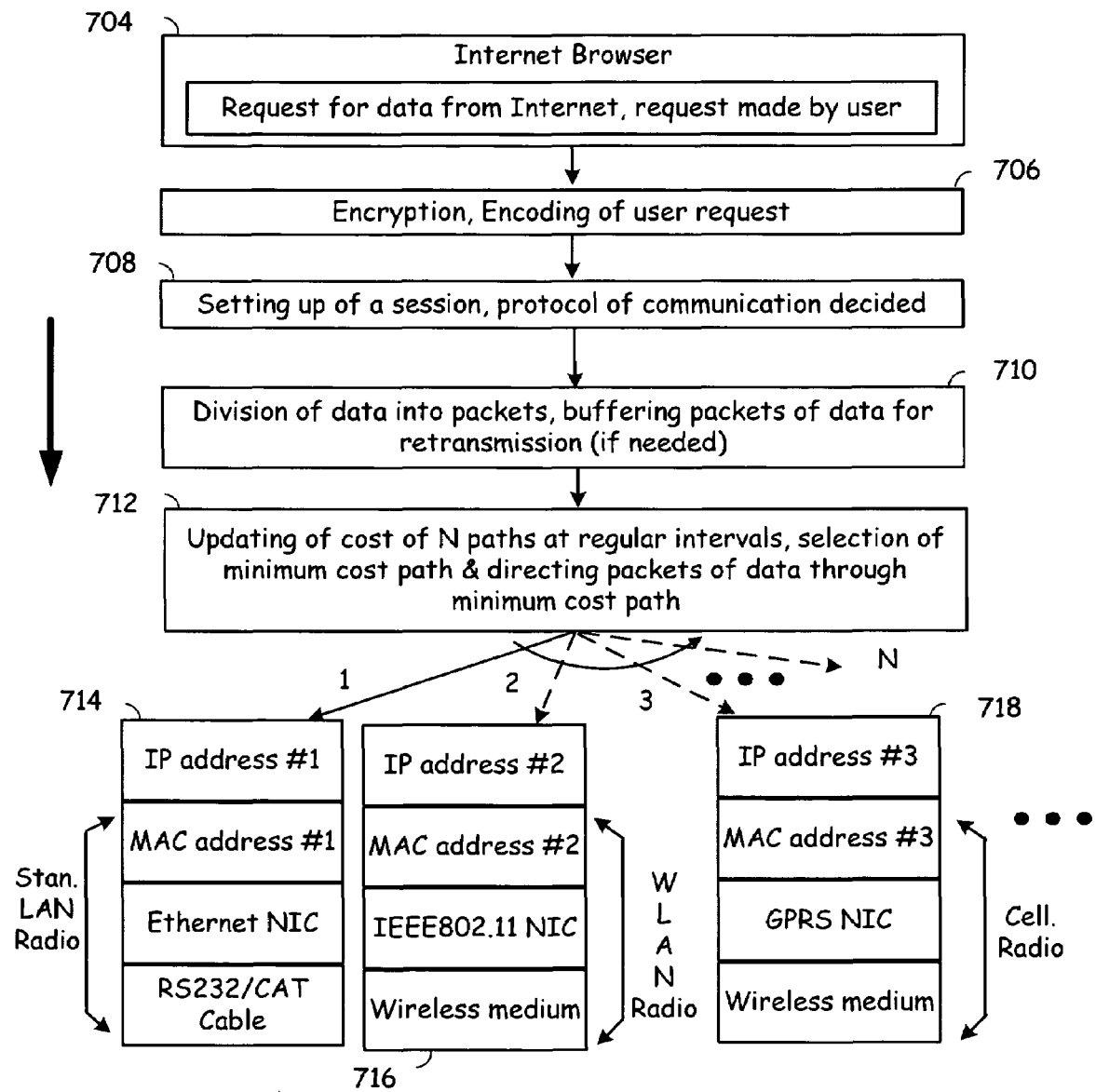
FIG. 7 is a flow chart illustrating functions performed by protocol layers of a computing device that supports a plurality of pathways between the computing device and Internet.

FIG. 7 is a flow chart illustrating functions performed by protocol layers of a computing device that supports a plurality of pathways between the computing device and Internet. The uppermost protocol layer of the computing device is running an Internet browsing program as shown in block 704. A user who interacts with the Internet browsing program inputs a user selection. The user selection may identify a web page. The Internet browsing program generates a request data for the selected web page from the Internet. A lower protocol layer encrypts and/or encodes the request data as shown in block 706. Encryption and/or encoding may be performed to save the request data from possible errors during transmission through physical medium. A next lower protocol layer decides upon a communication protocol that will be used by the computing device (i.e., hardware and/or software of the computing device) for transmitting and receiving data information from the Internet as shown in block 708. A further lower protocol layer divides the request data into packets as shown in block 710.

The computing device comprises at least an Ethernet LAN radio, an IEEE 802.11 radio and a GPRS radio. The computing device is connected to the Internet via an Ethernet local area network (LAN), an IEEE 802.11 network and a GPRS network using the Ethernet LAN radio, the IEEE 802.11 radio and the GPRS radio respectively. The Ethernet LAN radio is uniquely identified by a first MAC address as shown in block 714. The IEEE 802.11 radio is uniquely identified by a second MAC address as shown in block 716. The GPRS radio is uniquely identified by a third MAC address as shown in block 718. The computing device is thus communicatively connected to the Internet via at least three communication pathways, a first pathway via the Ethernet LAN radio, a second pathway via the IEEE 802.11 radio and a third pathway via the GPRS radio. A second next lower protocol layer as shown in block 712 calculates cost of each of the plurality of pathways between the computing device and Internet at regular intervals. The cost of each of the plurality of pathways may depend on monetary cost of the corresponding path, data traffic on the corresponding path, delay in the corresponding path, interference present in the corresponding path etc. Parameters on which the cost of each of the plurality of pathways depend change with time. The second next lower protocol layer retrieves the parameters at regular intervals and subsequently calculates and updates the cost of each of the plurality of pathways. The second next lower protocol layer receives the packets containing the request data from the further lower protocol layer. The second next lower protocol layer directs the packets containing the request data via a pathway that offers minimum cost among the plurality of pathways. The packets reach the physical medium (wired or wireless) via the pathway that offers the minimum cost. The packets are embedded with a first IP address if the minimum cost path is the first pathway via the Ethernet LAN radio. The packets are embedded with a second IP address if the minimum cost path is the second pathway via the IEEE 802.11 radio. The packets are embedded with a third IP address if the minimum cost path is the third pathway via the GPRS radio. The packets embedded with an IP address reach the Internet via the selected minimum cost path.

Figure 8:
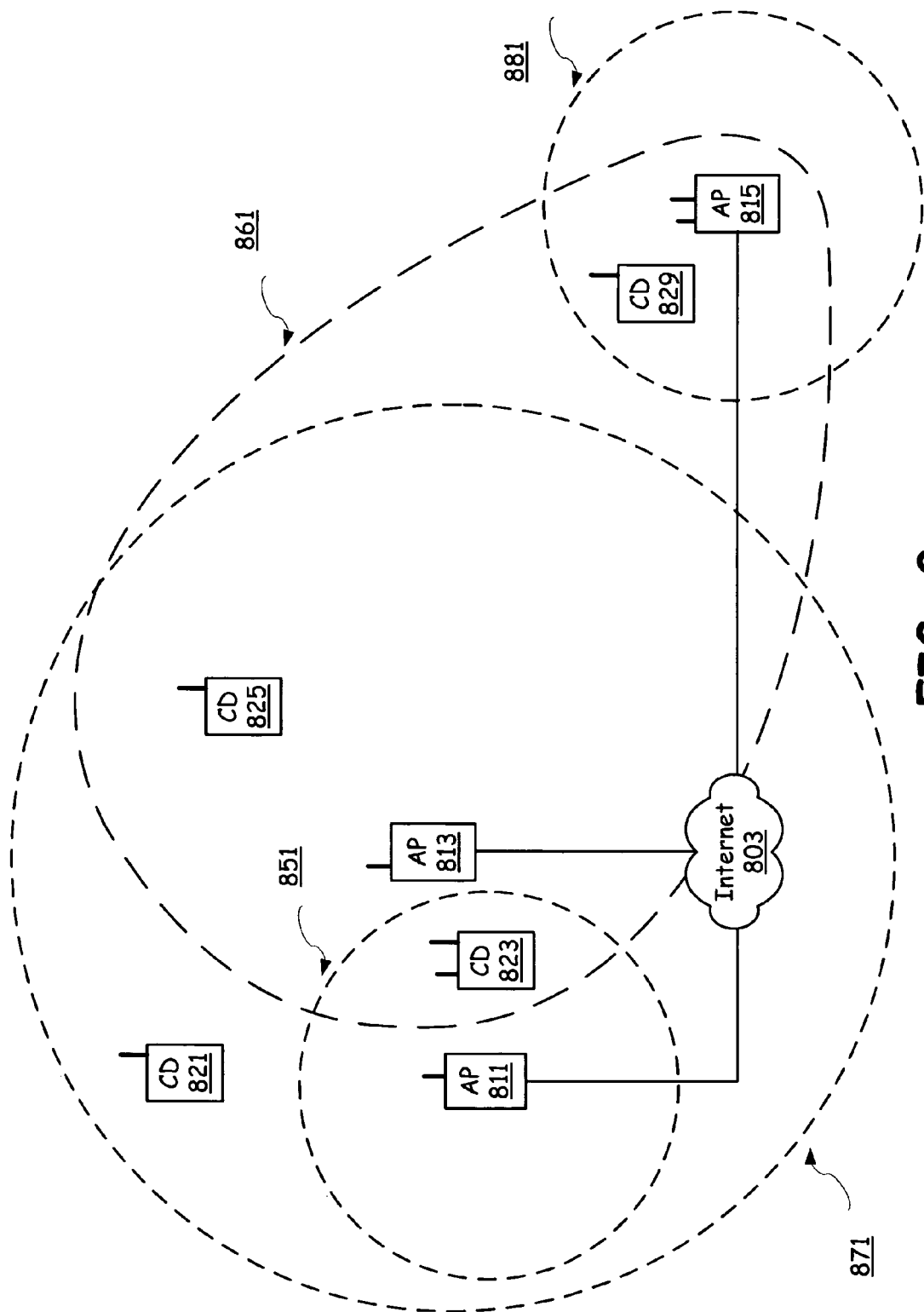
FIG. 8 is a schematic that shows a plurality of client devices under service area of a plurality of access points.

FIG. 8 is a schematic that shows a plurality of client devices under service area of a plurality of access points. A first access point 811 serves a first circular geographical area 851. The first access point 811 is communicating with Internet 803 using a first packet data exchange protocol. For example and without limitation the first packet data exchange protocol is WiMax protocol. A second access point 813 serves a second circular geographical area 871. In this example the second access point 813 is communicating with the Internet 803 using a second packet data exchange protocol, UMTS protocol. A third access point 815 serves a third circular geographical area 881 using the WiMax protocol. The third access point 815 in addition serves a fourth geographical area 861 using a third packet data exchange protocol, IEEE 802.11 protocol.

A first client device 821 is located in the second circular geographical area 871. The first client device 821 associates itself with the second access point 813. The second access point 813 assigns a first IP address to the first client device 821. The first client device 821 transmits and receives data packets from the Internet 803 via the second access point 813 using the first IP address and the UMTS protocol.

A second client device 823 is located in an overlapping region between the first circular geographical area 851, the second circular geographical area 871 and the fourth geographical area 861. The second client device 823 associates itself with the first access point 811, the second access point 813 and the third access point 815. Each of the 811, 813 and 815 assigns a separate IP address to the second client device 823. The second client device 823 communicates with the Internet 803 via three different paths, a first path via the first access point 811 and using the WiMax protocol, a second path via the second access point 813 and using the UMTS protocol and a third path via the third access point 815 and using the IEEE 802.11 protocol.

A third client device 825 is located in an overlapping region between the second circular geographical area 871 and the fourth geographical area 861. The third client device 825 associates itself with the second access point 813 and the third access point 815. Each of the 813 and 815 assigns a separate IP address to the third client device 825. The third client device 825 communicates with the Internet 803 via two different paths, a fourth path via the second access point 813 and using the UMTS protocol and a fifth path via the third access point 815 and using the IEEE 802.11 protocol.

A fourth client device 829 is located in an overlapping region between the third circular geographical area 881 and the fourth geographical area 861. The fourth client device 829 associates itself with the third access point 815. The third access point 815 assigns two separate IP addresses to the fourth client device 829. The fourth client device 829 communicates with the Internet 803 via two different paths, a sixth path via the third access point 815 and using the WiMax protocol and a seventh path via the third access point 815 and using the IEEE 802.11 protocol.

At an instance of time the third client device 825 moves to the location of the fourth client device 829. The third client device 825 is now not covered by service area of the second access point 813. Association of the third client device 825 with the second access point 813 is lost. Association of the third client device 825 with the third access point 815 remains unchanged. However the third client device 825 communicates with the third access point 815 via an eighth path, and using the IEEE 802.11 protocol. The third client device 825 is now located within the third circular geographical area 881. The third client device 825 communicates with the third access point 815 via a ninth path and using the WiMax protocol. The third client device 825 now communicates with the Internet 803 via two paths, both the two paths different from previous two paths the third client device 825 used to communicate with the Internet 803.

Figure 9:
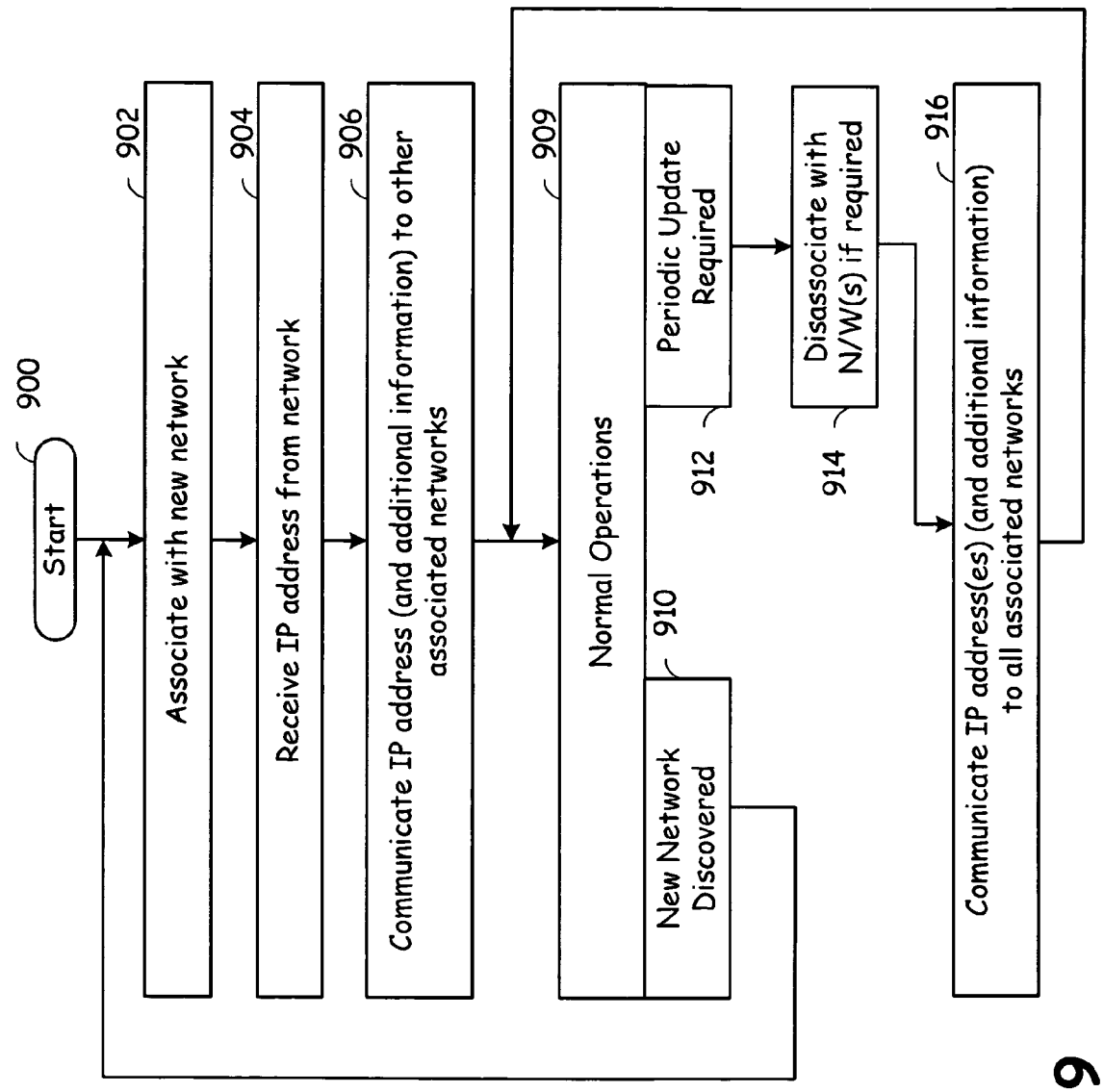
FIG. 9 is a flow chart illustrating a method of associating with a packet data network by a client device.

FIG. 9 is a flow chart illustrating a method of associating with a packet data network by a client device. The process of network association by the client device starts at block 900 when the client device is turned on. The client device associates with a first packet data network in a next block 902. The client device associates with an access point that belongs to the first packet data network. Association of the client device with the first packet data network (i.e., the access point) may involve the client device sending an association request to the access point. The client device is located within a geographical area that is serviced by the access point. The access point grants association permission to the client device by sending an IP address to the client device as shown in block 904. The client device uses the IP address assigned by the access point for all future communication with the access point. A second packet data network may serve the geographical area within which the client device is located. The client device after being turned on also associates with the second packet data network. The client device associates with all packet data networks that serve the geographical area within which the client device is located.

In block 906 the client device communicates the IP address assigned by the access point that belongs to the first packet data network to all other packet data networks (or access points belonging to the all other packet data networks). If the client device discovers a new packet data network, then the process flow jumps to block 902, where the client device associates with the new packet data network. The new packet data network may be discovered when the client device changes location or when an access point belonging to the new packet data network turns on.

The client device periodically updates associations with the all packet data networks as shown in a block 912. At an instance of time the client device may move out of a service area of a particular access point and subsequently the client device disassociates with the particular access point. The client device communicates IP addresses corresponding to a plurality of associations with a plurality of packet data networks (or access points) to the plurality of packet data networks as shown in block 916. The process flow jumps to block 909, and the client device updates associations with the all packet data networks.

Figure 10:
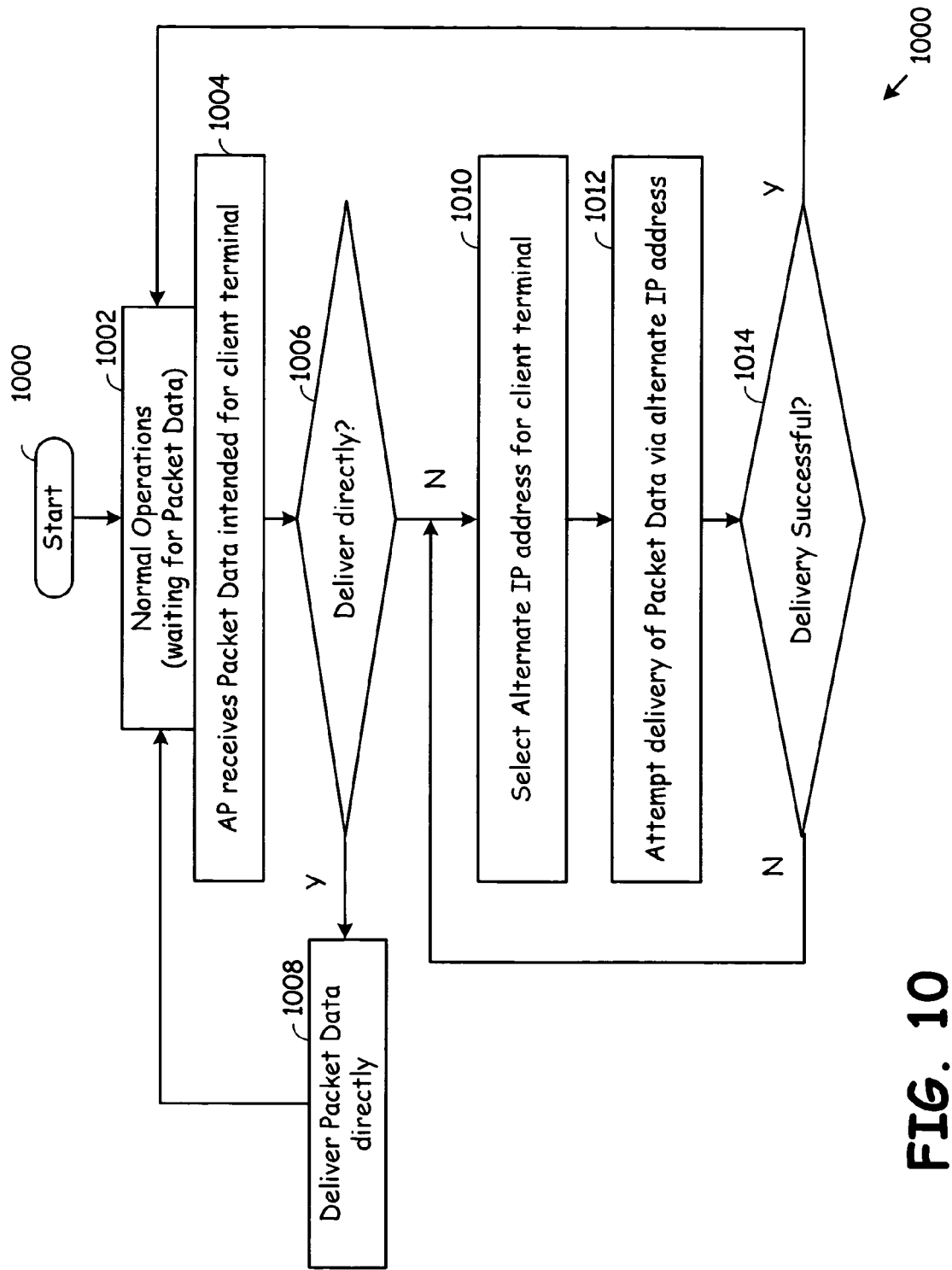
FIG. 10 is a flow chart illustrating a method of delivery of data packets to a client terminal by an access point that belongs to a packet data network.

FIG. 10 is a flow chart illustrating a method of delivery of data packets to a client terminal by an access point that belongs to a packet data network. The packet data network may be a WiMax network, a GPRS network, an EDGE network, a GSM network, a WCDMA (Wideband CDMA) network, an IEEE 802.11 network, an Ethernet network, a fiber optic network, a satellite data network, a cable network or any of a variety of networks that carries data fragmented into packets. The data may be one or more of a picture, a video, an audio, a text message, a web page, a music video, a television program, an entertainment event and any of a variety of live or archived multimedia information. The access point is associated with the client terminal. The client terminal may be a personal computer, a headphone, a set top box, a phone or any of a variety of devices that is adapted to send and receive the data fragmented into packets. The access point that belongs to the packet data network comprises at least one transceiver that receives a data packet from the client terminal and sends the received data packet to the packet data network it belongs to. The at least one transceiver also receives another data packet from the packet data network it belongs to and sends the received data packet to the client terminal.

Process of delivering the data packets to the client terminal by the access point begins at block 1000 after the client terminal associates with the access point. The access point assigns a first IP address to the client terminal upon association. The access point waits for the data packets from the packet data network it belongs to as shown in block 1002. The access point receives the data packets intended for the client terminal in step 1004. The access point may be associated with one or more client terminals other than the client terminal. Destination address of the data packets is embedded within the data packets. The access point identifies the destination address of the data packets by analyzing the data packets and attempts to deliver the data packets intended for the client terminal to the client terminal in the step 1004. The access point may be communicatively connected to the client terminal via one or more pathways. If the access point is communicatively connected to the client terminal via single pathway, then the client device ascertains if the single pathway may be used for delivery of the data packets to the client terminal in step 1006. If so, the access point delivers the data packets to the client terminal via the single pathway as shown in block 1008. The access point now waits for arrival of a new set of data packets from the packet data network as shown in block 1002.

If the access point is communicatively connected to the client terminal via a plurality of pathways, then the access point may be adapted to select a pathway from the plurality of pathways. The access point finds out if the data packets may be delivered to the client terminal via the selected pathway in block 1006. If so, the access point delivers the data packets to the client terminal via the selected pathway as shown in block 1008. The access point next awaits the new set of data packets from the packet data network as shown in block 1002.

The access point may find out that delivery of the data packets to the client device via either the single pathway or the selected pathway is not possible in block 1006. The client device is associated with at least a second access point. The second access point may belong to the same packet data network that the access point belongs to. The second access point may alternately belong to a heterogeneous second packet data network. The second access point assigns a second IP address to the client device. The client device informs the access point about the second IP address and the second access point when the client device associates with the access point in block 1000. If the access point is unable to send the data packets via either the single pathway or the selected pathway, then the access point attempts to send the data packets to the client terminal via the second access point as shown in block 1012. The client device may be associated with a plurality of access points different from the access point. In such a case the access point is aware of the plurality of access points the client device is associated with and corresponding IP addresses. The access point selects a third access point from the plurality of access points in block 1010. The access point attempts to send the data packets to the client terminal via the selected third access point as shown in block 1012. If the delivery of data packets is successful then the access point jumps to block 1002 where the access point next awaits arrival of the new set of data packets from the packet data network. If the delivery of data packets is unsuccessful then the access point goes to block 1010 and selects a fourth access point from the plurality of access points for delivery of the data packets to the client device. The access point attempts repeatedly to ensure that the data packets intended for the client device reaches the client device finally.

Figure 11:
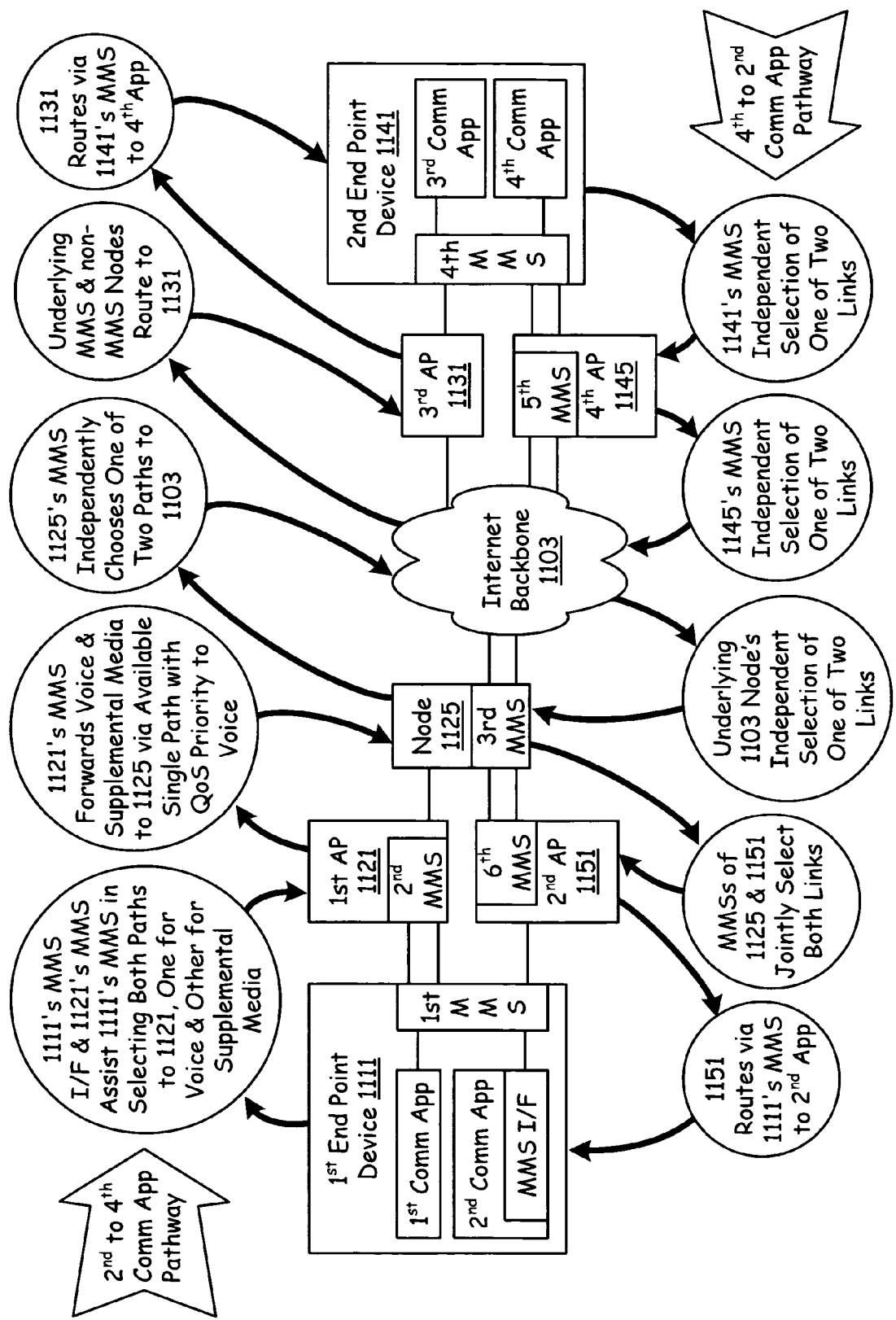
FIG. 11 is a schematic and functional block diagram illustrating exemplary pathway selections made by multi-path management software (MMS) in accordance with the present invention.

FIG. 11 is a schematic and functional block diagram illustrating exemplary pathway selections made by multi-path management software (MMS) in accordance with the present invention. Communication between a first end point device 1111 and a second end point device 1141 may flow through any selected one or more of a plurality of available pathways supported by a network node 1125, Internet backbone 1103, and a first, second, third and fourth access point (AP) 1121, 1151, 1131, and 1145, respectively. Depending on setup parameters and the nature of the underlying communication application requirements, one or more of the MMS applications running on the first and second end point devices 1111 and 1141, the first, second, third and fourth APs 1121, 1151, 1131, and 1145, and the network node 1125 operate independently or in concert to make the selection.

A first communication application and a second communication application are running on the first end point device 1111, while a third communication application and a fourth communication application run on the second end point device 1141. The end point devices may be client devices and servers, for example, with the first, second, third and fourth communication applications each comprising a video game, Internet telephony application, Internet browsing application, or other communication application that needs a communication pathway to a remote end point device. For example and without limitation, the second communication application running on the first end point device 1111 and the $4^{th}$ communication application running on the second end point device 1141 might be Internet telephony applications, wherein the first and second end point deices 1111 and 1141 comprise VoIP telephones. As such, the second communication application needs to send to (and receive from) the fourth communication application voice and supplemental media (if any). Alternatively, for example, the second communication application might comprise client game software or client browser software on a client computer that interact with game server software or web server software on a server.

Many communication pathways are available between the second communication application of the first end point device 1111 and the fourth communication application of the second end point device 1141. As illustrated, the second communication application may utilize up to three links to the first and second access points 1121 and 1151. In turn, the access points 1121 and 1151 together have three links to the network node 1125 which itself has two links to the Internet backbone 1103. From the Internet backbone 1103, three links lead to the third and fourth access points 1131 and 1145 which together have three links to the second end point device 1141. Each link may be wireless or wired.

Any single or simultaneous multiple pathways may be selected through selection from among the plurality of links. One or more of the MMS applications on the first and second end point devices 1111 and 1141, the first, second, third and fourth APs 1121, 1151, 1131, and 1145, and the network node 1125 select the one or more pathways. If the communication application, such as the second communication application of the first end point device, has a software interface to an MMS, the communication application may send requirements information (e.g., bandwidth, QoS, etc.) thereto to assist the MMS in making the pathway selection. Such communication application may also direct or become more active in the pathway selection by the MMS. If a communication application has no specific ability or is not configured to assist or direct an MMS, the MMS will either retrieve preset parameters for such communication application or interact with the user (through pop-up windows, for example) to acquire such parameters and base the pathway selection thereon.

An MMS application running on end point devices can make the entire pathway selection on a link by link basis, or only select, for example, from among the local links. That is, the first MMS of the first end point device 1111 could select the entire pathway from the first end point device 1111 to the second end point device 1141 after retrieving parameters from one or more of: 1) the second communication application; 2) local or remote storage regarding the second communication applications; 3) local or remote storage regarding the first communication applications; 4) communication characteristics of each local link; and 5) communication characteristics of each remote link from each of the plurality of remote MMS applications. If the parameters of the second communication application are unknown, the first MMS may select a default pathway. Thereafter and no matter how the initial pathway was selected, the first MMS analyzes the traffic flow from the second communication application through the network, and, based on such analysis, may seamlessly switch to another pathway if necessary.

Likewise, the first MMS of the first end point device 1111 could pass control of entire pathway selection or local link selection to the communication application. Alternatively, each MMS may be responsible for only local pathway selections. For example, the first MMS of first end point device 1111 might select to use one of the two illustrated links to the first AP 1121 to support the second communication application, while choosing to use the other of the two links to the first AP 1121 and the link to the second AP 1151 to support the first communication application. The sixth MMS of the second AP 1151 might in turn select one or both of the links to the network node 1125, while the second MMS of the first AP 1121 would converge communications from the two incoming links onto the single output link to the network node 1125. In turn, the network node 1125 might split up the incoming flow onto the two outgoing links or choose a single outgoing link to the Internet backbone 1103. Although not shown, the Internet backbone 1103 might have further network nodes that contain MMS applications that make similar link decisions to get to either or both of the third and fourth APs 1131 and 1145 and, in turn, to the second end point device 1141. In this "localized" decision process, the MMS applications on each node may make their selection based on retrieval of parameters from one or more of: 1) the second communication application; 2) local or remote storage regarding the second communication applications; 3) local or remote storage regarding the first communication applications; 4) communication characteristics of each local link; and 5) underlying communication traffic experienced. Thereafter, each MMS analyzes the traffic flow, and seamlessly switches to other or additional links if necessary.

More specifically, in one exemplary configuration, the second communication application generates a first plurality of voice packets and supplemental media packets for communication to the first MMS. The first end point device 1111 is communicatively coupled to the first access point (AP) 1121 via two (wireless and/or wired) links and communicatively coupled to the second AP 1151 via a single link. The first MMS running on the first end point device 1111 and the second MMS running on the first AP 1121 assist each other in pathway selection and jointly decide to use first of the two pathways and to use second of the two pathways for sending the first plurality of voice packets and the supplemental media packets respectively from the first end point device 1111 to the first access point 1121.

The first AP 1121 is communicatively connected to the network node 1125 via a single link. The second MMS running on the first AP 1121 directs the first plurality of voice packets and the supplemental media packets to the node 1125 via the available single link. The second MMS sets a higher QOS (Quality of Service) limit for the first plurality of voice packets than the first plurality of supplemental media packets. The first AP 1121 (or the second MMS directs the first AP 1121 to send) sends the first plurality of voice packets to the node 1125 only if the single link meets the QOS requirement for the first plurality of voice packets. At an instance of time, the second MMS may not find the single link suitable for carrying the first plurality of voice packets, but suitable for carrying the supplemental media packets. Because of this, the second MMS directs the first AP 1121 to send only the supplemental media packets to the node 1125 via the single link.

The node 1125 is communicatively coupled to the Internet backbone 1103 via two links. The third MMS running on the node 1125 selects one of the two links to the Internet backbone 1103, and sends the first plurality of voice packets and the supplemental media packets received from the first AP 1121 to the Internet backbone 1103 via the selected link. Selection of one of the two available links by the third MMS does on depend on link taken by the data packets and the supplemental media packets to reach the node 1125 from the first end point device 1111. The Internet backbone 1103 consists of a plurality of computing devices, routers, switches, base stations, transceivers, domain name servers, proxy servers, storage servers, for example. One or more of components of the Internet backbone 1103 send the received first plurality of voice packets and the supplemental media packets to a third AP 1131. The third AP 1131 forwards the received first plurality of voice packets and the supplemental media packets to the second end point device 1141 via the only available communication link. Of course other pathway links may have been selected in replacement or in addition to those mentioned, and the control of such selection could be passed to any single MMS, few MMS's, or the communication application.

Upon analyzing the first plurality of voice packets and the supplemental media packets received from the third AP 1131, the fourth MMS determines that the destination is the fourth communication application of the second end point device 1141. The fourth MMS responds by forwarding the received first plurality of voice packets and the supplemental media packets to the fourth communication application. In response, the fourth communication application generates a second plurality of voice packets and supplemental media packets. The fourth MMS, in this example, sends the second plurality of voice packets and supplemental media packets to the fourth AP 1145. The second end point device 1141 is communicatively coupled to the fourth AP 1145 via two links. The fourth MMS selects one or both of the two links and sends the second plurality of voice packets and supplemental media packets there through.

Selection of one or more of the two links by the fourth MMS for the response need not be the same as that of the incoming voice packets and supplemental media from the second communication application. The fourth MMS may however consider the bandwidth utilization of such incoming information in deciding to choose a different link for outgoing information. In the example, the fourth MMS receives the first plurality of voice packets from the Internet backbone 1103 via the third AP 1131, and sends the second plurality of voice packets to the Internet backbone 1103 via the fourth AP 1145. Alternately, the fourth MMS may send the second plurality of voice packets and the supplemental media packets to the Internet backbone 1103 via the third AP 1131.

The fifth MMS is running on a fourth AP 1145. The fifth MMS forwards the second plurality of voice packets and the supplemental media packets received from the second end point device 1141 to the Internet backbone 1103. The Internet backbone 1103 is communicatively coupled to the node 1125 via the two links. The third MMS running on the node 1125 selects one of the two links for receiving the second plurality of voice packets and the supplemental media packets from the Internet backbone 1103 and informs the Internet backbone 1103 about the selection. The selected pathway may be same or different from the pathway the node 1125 uses to send the first plurality of voice packets and the supplemental media packets to the Internet backbone 1103. The Internet backbone 1103 forwards the second plurality of voice packets and supplemental media packets received from the fourth AP 1141 to the node 1125 via the selected link.

The third MMS running on the node 1125 and the sixth MMS running on a second AP 1151 jointly select two links between the node 1125 and the second AP 1151 to carry the second plurality of voice packets and the supplemental media packets from the node 1125 to the second AP 1151. One of the two selected links carries the second plurality of voice packets and a second of the two selected links carries the second plurality of supplemental media packets. In an alternate configuration, the third MMS running on the node 1125 and the second MMS running on the first AP 1121 may jointly decide to carry the second plurality of voice packets and the supplemental media packets via the first AP 1125. The third MMS performs link selection twice during full duplex communication between the second communication application and the fourth communication application, once for the first plurality of voice packets and supplemental media packets and a second time for the second plurality of voice packets and the supplemental media packets.

The second AP 1151 forwards the received second plurality of voice packets and the supplemental media packets to the first end point device 1111. The first MMS running on the first end point device 1111 analyzes the second plurality of voice packets and the supplemental media packets and forwards them to the second application running on the end point device 1111.

To support the first or any other communication application, the first MMS of the first end point device 1111 either: 1) prompts the user to enter default parameters for the first communication application (pop-up asking if the first communication application is for streaming video, streaming audio, voice call, video call, file delivery, Internet browsing, text chat exchange, etc.); 2) retrieves a preset configuration from a remote server; 3) retrieves a preset configuration from local memory; 4) retrieves preset configuration from an MMS interface if available; or 5) uses a default configuration. This configuration consists of a plurality of parameters relating to: a) the general communication requirements from and to the communication application; b) media types exchanged; and c) control configuration (e.g., communication application joint or sole control, local MMS link selections/control; single MMS full pathway selection/control, etc.).

The end point devices 1111 and 1141 are network nodes. The access points 1121, 1131, 1141 and 1151, the network node 1125, and various nodes within the Internet backbone 1103 (not shown) are all supporting network nodes. Each node, of course, may or may not employ an MMS application, and, either way, the full pathway adapts in accommodation.

As one of average skill in the art will appreciate, the term "communicatively coupled", as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A computing device in a packet switched network having a plurality of access points, the computing device comprising:
 a plurality of communication interfaces, each of the plurality of communication interfaces having at least one unique network address delivered through a corresponding one of the plurality of access points;
 a first lower layer module that is operable to communicatively couple with a first communication interface of the plurality of communication interfaces, in which the first communication interface operates with a first access point for a data exchange between the computing device and an upstream device via a first path;
 a second lower layer module that is operable to communicatively couple with a second communication interface of the plurality of communication interfaces, in which the second communication interface operates with a second access point for the data exchange between the computing device and the upstream device via a second path, wherein the first and second paths are alternative paths for the same data exchange;

an upper layer protocol manager that selects the first communication interface and the first lower layer module for the data exchange based on a selected communication factor; and the upper layer protocol manager to respond to a change in a characteristic of the first path associated with the communication factor by seamlessly switching from the first path having the first communication interface and the first lower layer module to the second path having the second communication interface and the second lower layer module to perform the data exchange.

2. The computing device of claim 1, further comprising a communication application communicatively coupled to the upper layer protocol manager, and the upper layer protocol manager interacts with the communication application before selecting the first communication interface and the first lower layer module.

3. The computing device of claim 1, wherein the communication factor to establish a minimum data rate required for the data exchange.

4. The computing device of claim 2, wherein the interaction by the upper layer protocol manager results in receiving the communication factor from the communication application.

5. The computing device of claim 1, wherein the characteristic of the first path associated with the communication factor varies with time and the upper layer protocol manager checks the characteristic of the first path periodically.

6. A computing circuitry comprising:
   memory that stores at least a portion of a communication application and at least a portion of a device driver, the device driver comprising a plurality of single-path sub-driver portions;
   processing circuitry communicatively coupled to the memory;
   a plurality of communication interfaces that each communicatively couple with the processing circuitry through execution by the processing circuitry of a corresponding one of the plurality of single-path sub-driver portions of the device driver, in which the plurality of communication interfaces includes a first communication interface that operates with a first single-path sub-driver portion to perform a data exchange between the communication circuitry and an upstream device via a first path that includes a first access point and in which the plurality of communication interfaces also includes a second communication interface that operates with a second single-path sub-driver portion to perform the data exchange between the communication circuitry and the upstream device via a second path that includes a second access point, wherein the first and second paths are alternative paths for the same data exchange;

the processing circuitry to identify a communication factor corresponding to the communication application and based on the communication factor, the processing circuitry selects the first path for the communication exchange and the processing circuitry to respond to a change in a characteristic of the first path associated with the communication factor by seamlessly switching from the first path having the first communication interface to the second path having the second communication interface in response to a change in the characteristic associated with the communication factor.

7. The computing circuitry of claim 6, wherein the processing circuitry monitors a plurality of communication characteristics associated with the communication factor.

8. The computing circuitry of claim 6, wherein the processing circuitry responds to the communication application to make the selection of the first communication interface.

9. The computing circuitry of claim 6, wherein the processing circuitry responds to a control signal received via at least one of the plurality of communication interfaces to make the selection of the first communication interface.

* * * * *